United States Patent [19]

Horsma et al.

[11] 4,330,703
[45] * May 18, 1982

[54] LAYERED SELF-REGULATING HEATING ARTICLE

[75] Inventors: David A. Horsma, Palo Alto; Bernard J. Lyons, Atherton; Robert Smith-Johannsen, Portola Valley, all of Calif.

[73] Assignee: Raychem Corporation, Menlo Park, Calif.

[*] Notice: The portion of the term of this patent subsequent to Dec. 4, 1996, has been disclaimed.

[21] Appl. No.: 78,386

[22] Filed: Sep. 24, 1979

Related U.S. Application Data

[63] Continuation of Ser. No. 601,638, Aug. 4, 1975, Pat. No. 4,177,376, which is a continuation-in-part of Ser. No. 510,036, Sep. 27, 1974, abandoned.

[51] Int. Cl.³ .................. H05B 3/12; H05B 3/38
[52] U.S. Cl. ................... 219/553; 174/DIG. 8; 219/505; 219/510; 219/528; 219/548; 252/511; 338/22 R; 338/212
[58] Field of Search ............... 219/504, 505, 510, 528, 219/549, 543, 548, 552, 553; 174/DIG. 8, 91, 92, 93; 338/7, 9, 20, 22 R, 22 SD, 23, 24, 211, 212, 322, 320; 264/25, 104, 105; 252/510, 511, 512; 361/106

[56] References Cited

U.S. PATENT DOCUMENTS

| | | | |
|---|---|---|---|
| T905,001 | 12/1972 | Day | 264/25 |
| 2,933,586 | 4/1960 | Schusterius | 338/22 SD X |
| 2,978,665 | 4/1961 | Vernet et al. | 338/223 |
| 3,067,311 | 12/1962 | Lacy-Hulbert | 219/552 |
| 3,311,862 | 3/1967 | Rees | 338/211 |
| 3,351,882 | 11/1967 | Kohler et al. | 338/322 |
| 3,375,774 | 4/1968 | Fujimura et al. | 338/22 X |
| 3,412,358 | 11/1968 | Hummel et al. | 338/212 X |
| 3,413,442 | 11/1968 | Buiting et al. | 219/553 X |
| 3,448,248 | 6/1969 | Armbruster | 219/528 |
| 3,535,494 | 10/1970 | Armbruster | 219/528 |
| 3,591,526 | 7/1971 | Kawashima et al. | 252/511 |
| 3,793,716 | 2/1974 | Smith-Johannsen | 338/20 X |
| 3,805,022 | 4/1974 | Kulwicki | 219/505 |
| 3,823,217 | 7/1974 | Kamps | 264/105 |
| 3,878,501 | 4/1975 | Moorehead et al. | 338/22 R |
| 3,914,727 | 10/1975 | Fabricius | 338/22 R |
| 3,958,208 | 5/1976 | Blaha | 338/22 R |
| 3,976,600 | 8/1976 | Mayer | 252/511 |
| 3,976,854 | 8/1976 | Ishikawa et al. | 219/505 |
| 4,017,715 | 4/1977 | Whitney et al. | 219/553 |
| 4,177,376 | 12/1979 | Horsma et al. | 219/553 |

FOREIGN PATENT DOCUMENTS

| | | |
|---|---|---|
| 1565355 | 11/1970 | Fed. Rep. of Germany . |
| 2103303 | 8/1971 | Fed. Rep. of Germany . |
| 2103268 | 4/1973 | Fed. Rep. of Germany . |
| 1167551 | 10/1969 | United Kingdom . |
| 1184656 | 3/1970 | United Kingdom . |
| 1251453 | 10/1971 | United Kingdom . |

*Primary Examiner*—Volodymyr Y. Mayewsky
*Attorney, Agent, or Firm*—Lyon & Lyon

[57] ABSTRACT

A self-regulating heating article comprising a layer of material exhibiting a positive temperature coefficient of resistance (PTC) and said PTC layer having at least partially contiguous therewith at least one layer of constant wattage output material. The article operates such that when connected to an electric power source, the current flows through at least a portion of the thickness of the PTC layer and of the constant wattage layer. In a preferred embodiment, upon heating the article, a change in dimensions as well as activation of an adhesive occurs.

51 Claims, 35 Drawing Figures

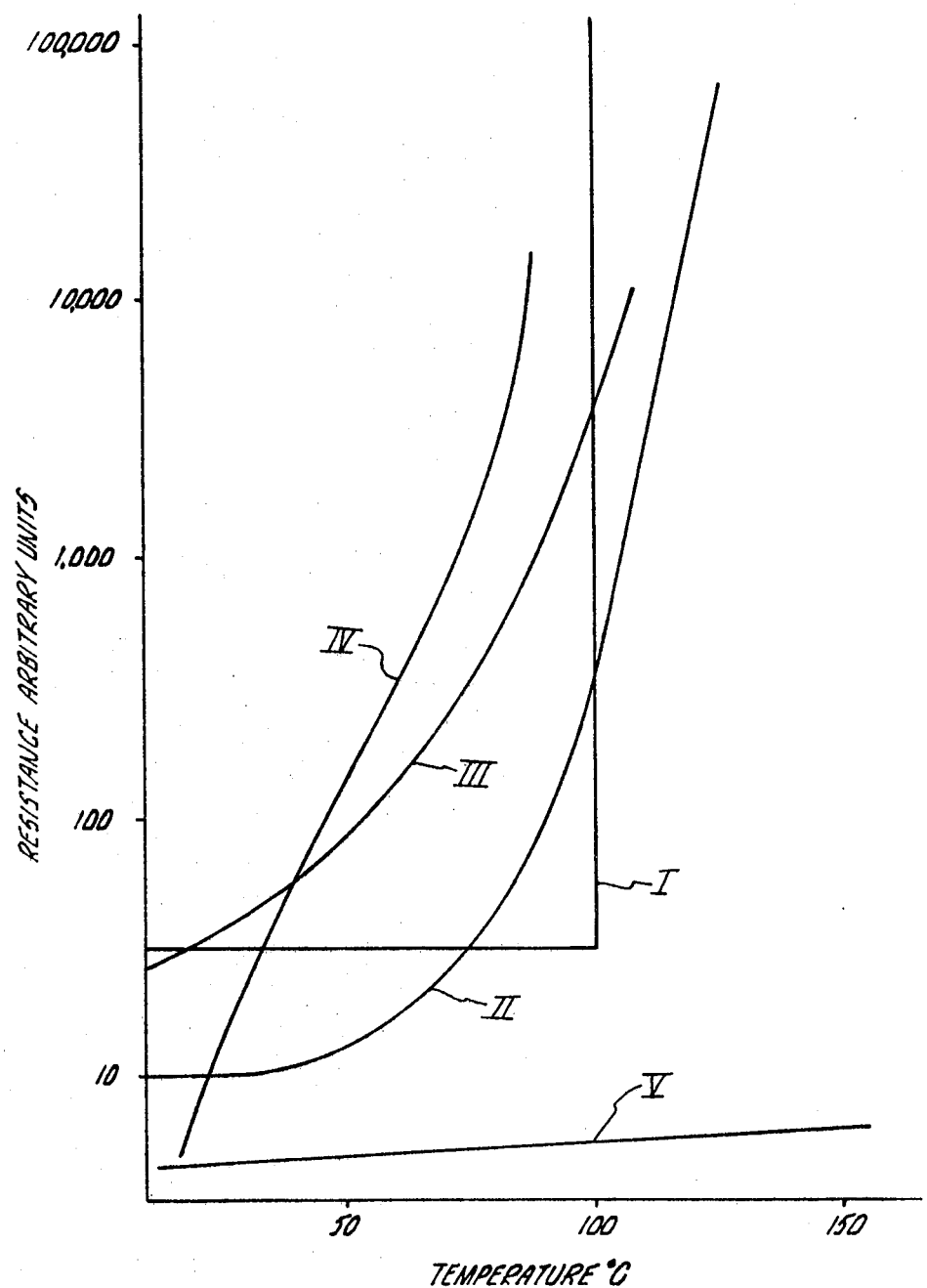

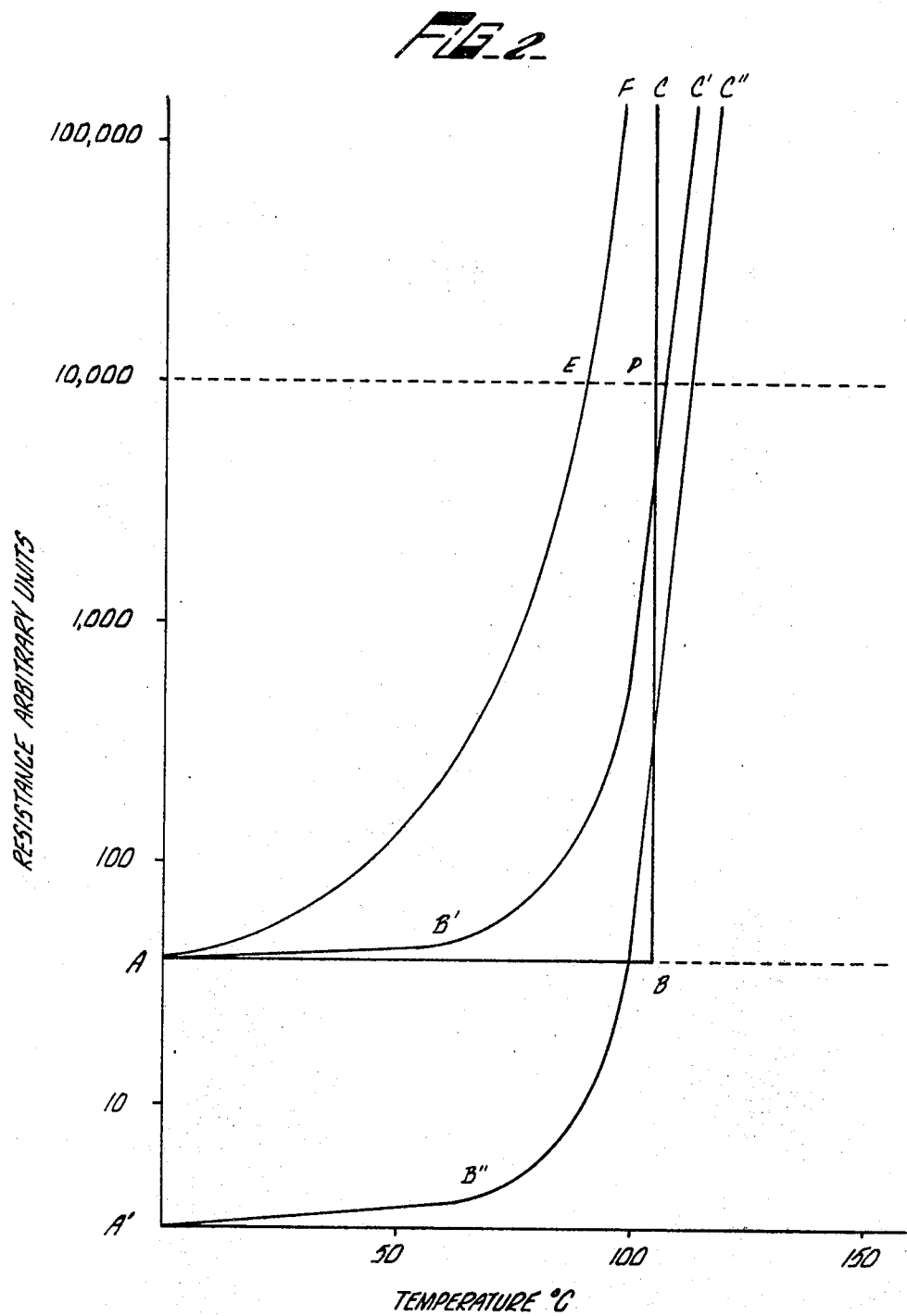

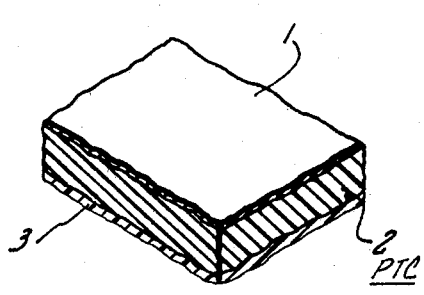
FIG_3_
(PRIOR ART)
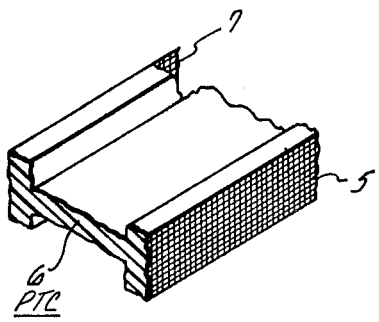
FIG_4_
(PRIOR ART)
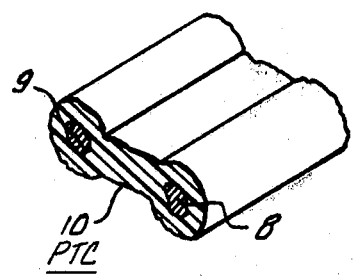
FIG_5_
(PRIOR ART)
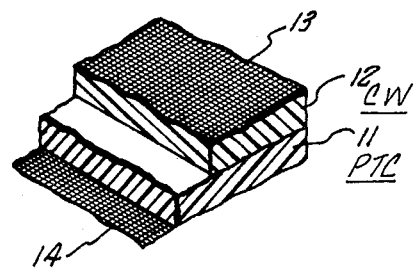
FIG_6_
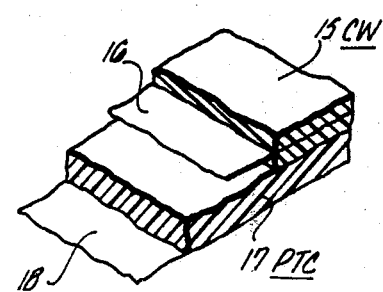
FIG_7_
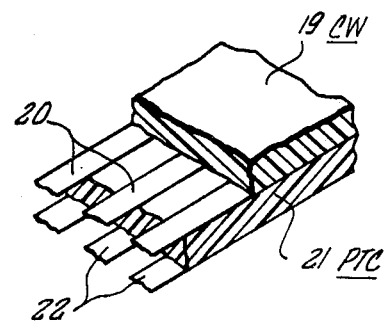
FIG_8_

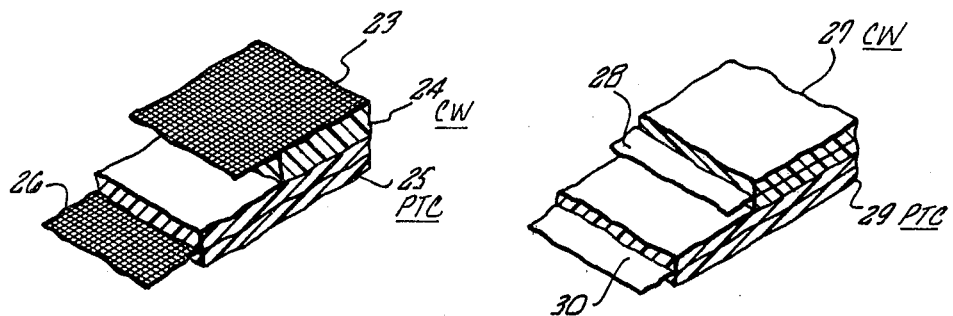
FIG_9. FIG_10.
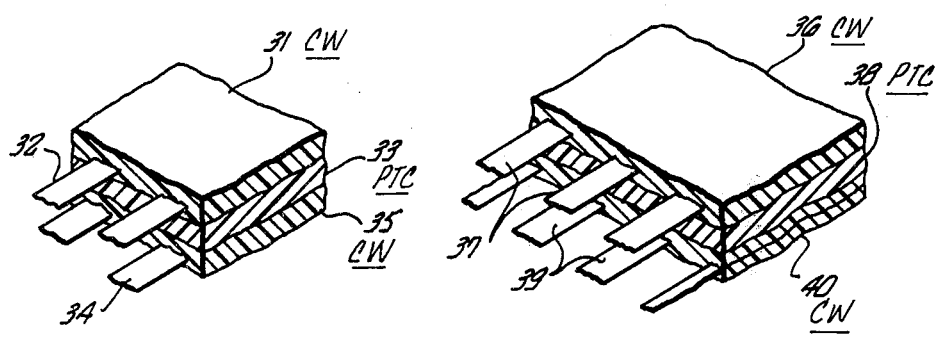
FIG_11. FIG_12.
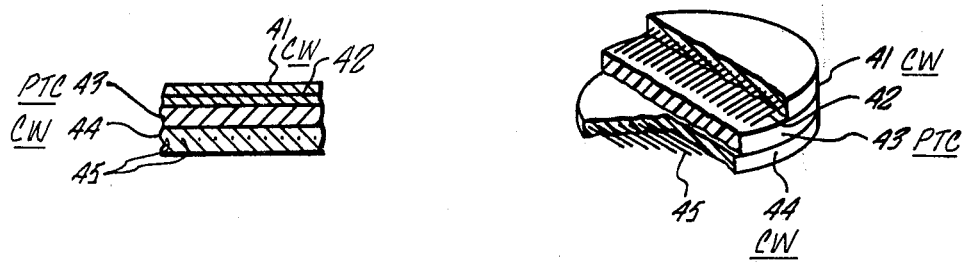
FIG_13a. FIG_13b.

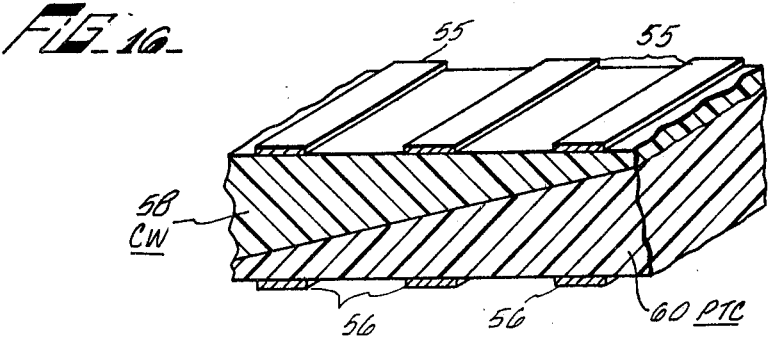
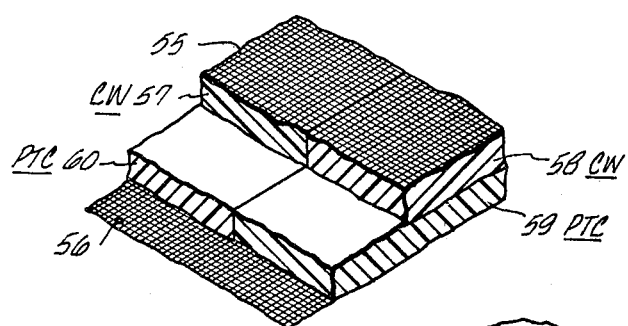
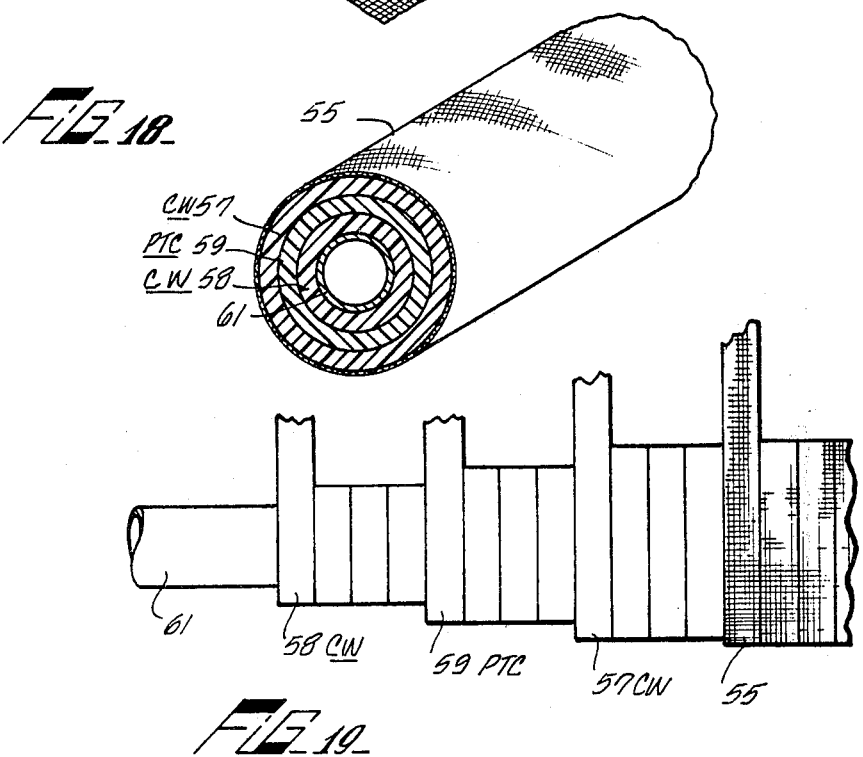

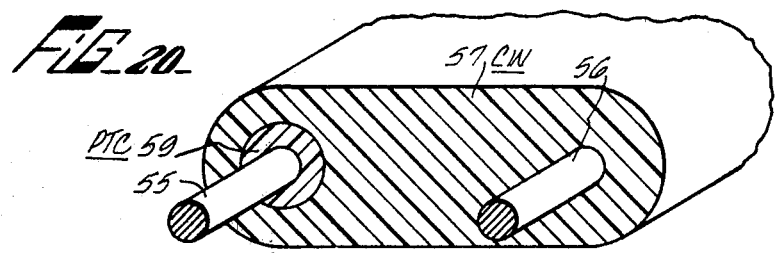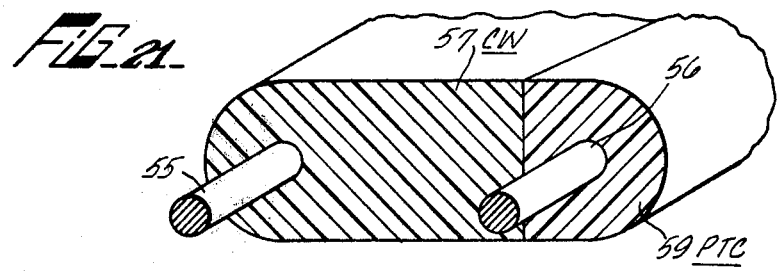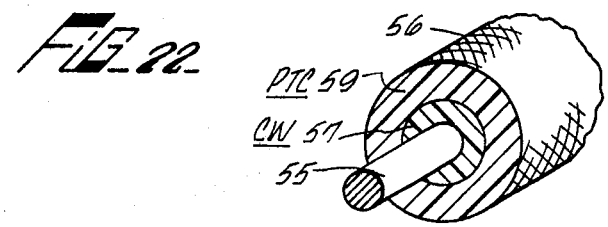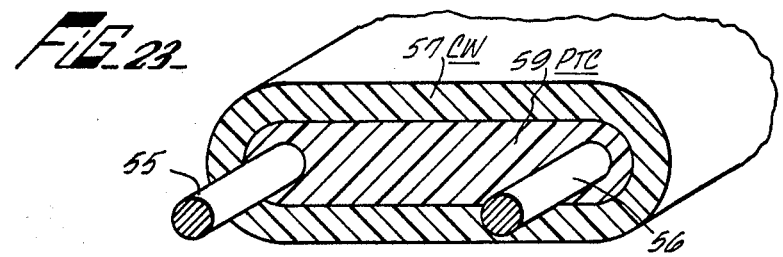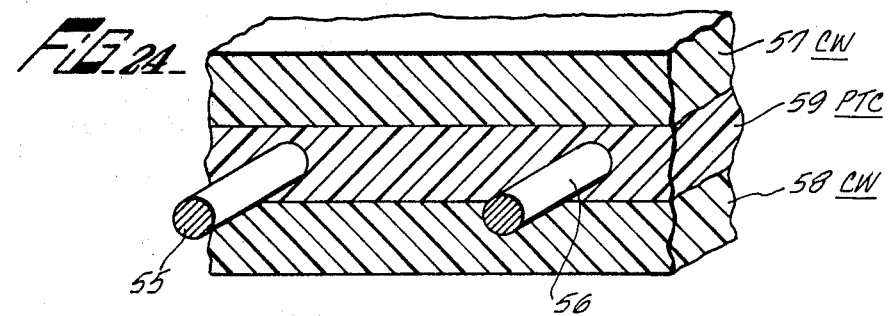

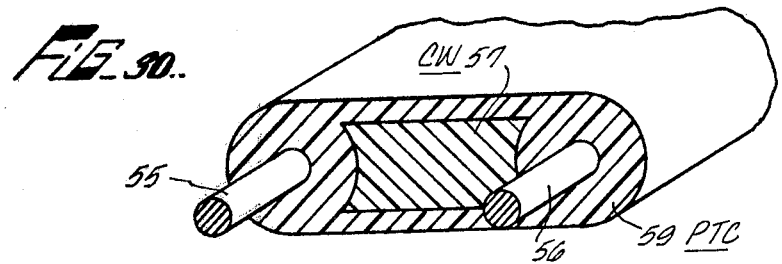
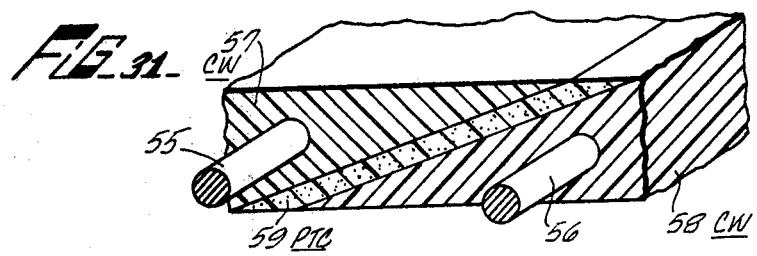
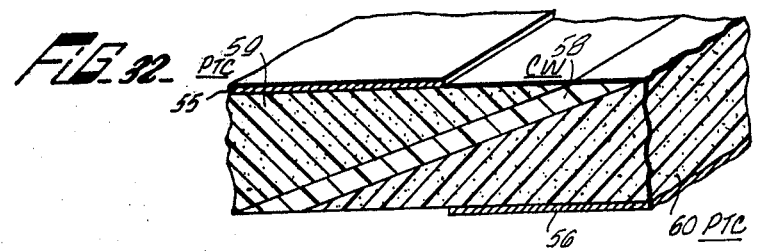
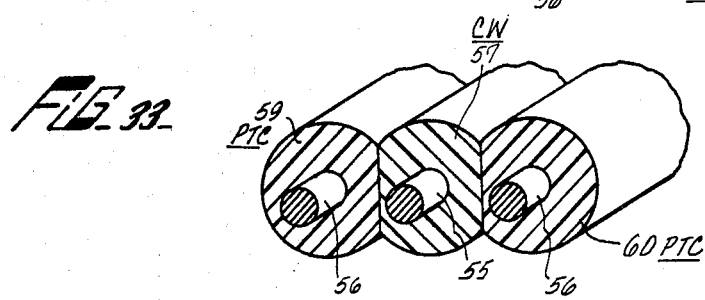
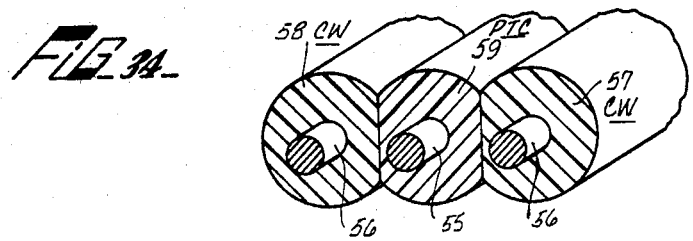

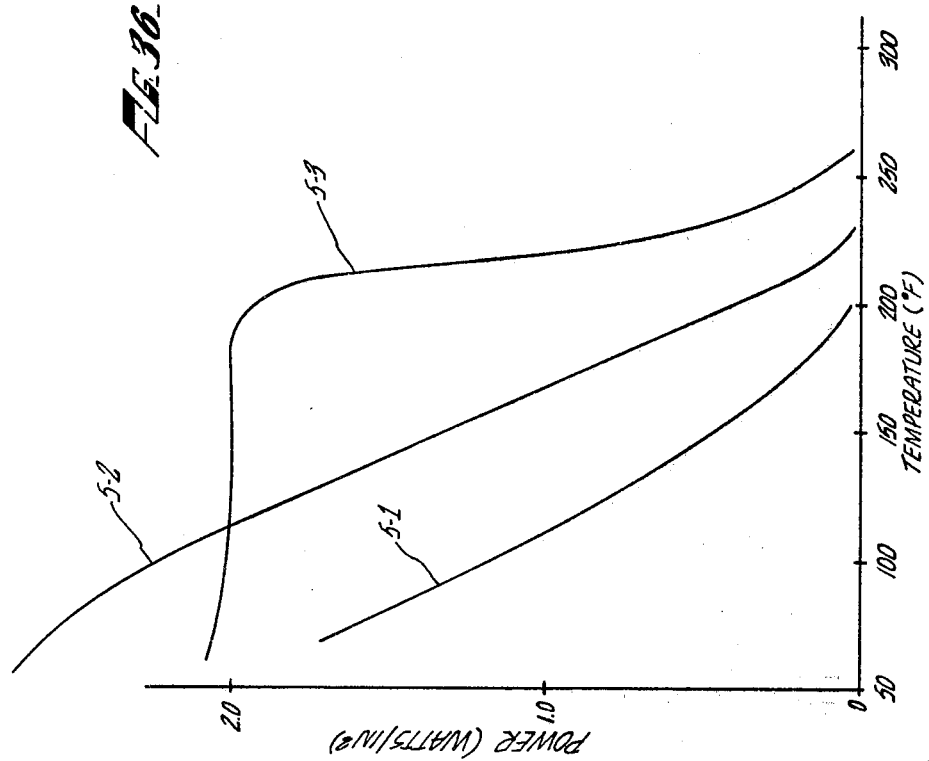
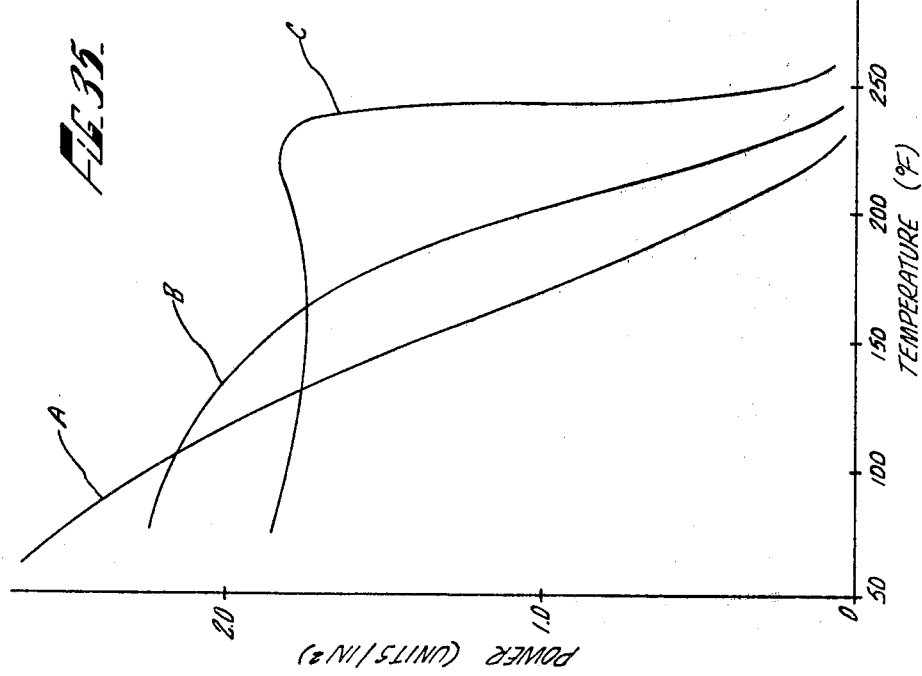

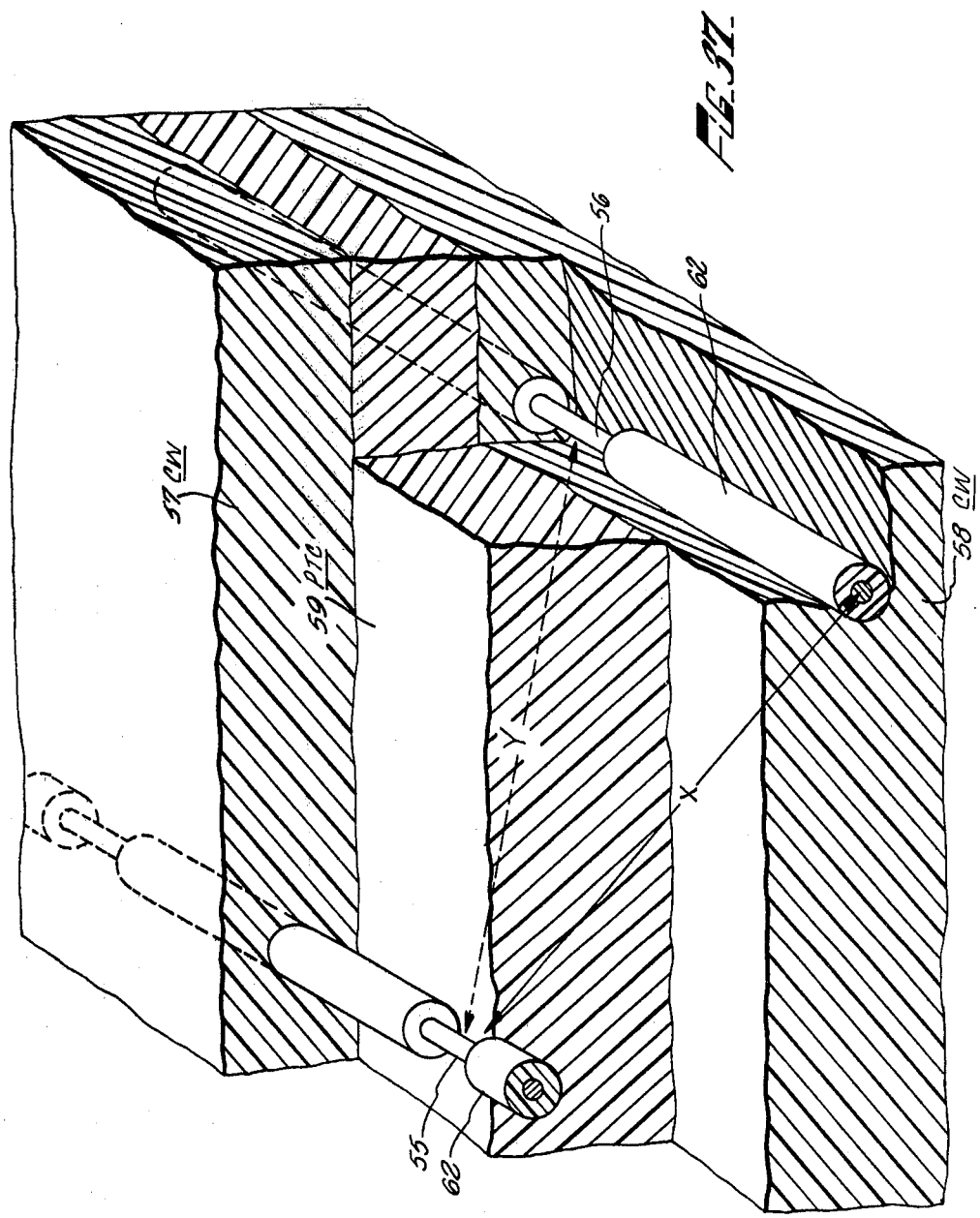

LAYERED SELF-REGULATING HEATING ARTICLE

This application is a continuation of U.S. Ser. No. 601,638 filed Aug. 4, 1975 (now U.S. Pat. No. 4,177,376) which is a CIP of U.S. Ser. No. 510,036, filed Sept. 27, 1974 (now abandoned).

BACKGROUND OF THE INVENTION

A new approach to electrical heating appliances in recent years has been self-regulating heating systems which utilize materials exhibiting certain types of PTC (positive temperature coefficient) of resistance characteristics. The distinguishing characteristic of the prior art PTC materials is that upon attaining a certain temperature, a substantial rise in resistance occurs. Prior art heaters utilizing PTC materials reportedly exhibit more or less sharp rises in resistance within a narrow temperature range, but below that temperature range exhibit only relatively small changes in resistance with temperature. The temperature at which the resistance commences to increase sharply is often designated the switching or anomaly temperature ($T_s$) since on reaching that temperature the heater exhibits an anomalous change in resistance and for practical purposes, switches off. Self regulating heaters utilizing PTC materials have advantages over conventional heating apparatus in that they generally eliminate the need for separate thermostats, fuses or in-line electrical resistors.

The most widely used PTC material has been doped barium titanate which has been utilized for self-regulating ceramic heaters employed in such applications for food warming trays and other small portable heating appliances. Although such ceramic PTC materials are in common use for heating applications, their rigidity has severely limited the number of applications for which they can be used. PTC materials comprising electrically conductive polymeric compositions are also known and certain types have been shown to possess the special characteristics described herein-above. However, in the past, use of such polymeric PTC materials has been relatively limited, primarily due to their low heating capacity. Such materials generally comprise one or more conductive fillers such as carbon black or powdered metal dispersed in a crystalline thermoplastic polymer. PTC compositions prepared from highly crystalline polymers generally exhibit a steep rise in resistance commencing a few degrees below their crystalline melting point similar to the behavior of their ceramic counterparts at the Curie temperature (the $T_s$ for ceramics). PTC compositions derived from polymers and copolymers of lower crystallinity, for example, less than about 50%, exhibit somewhat less steep increases in resistance which increase commences at a less well defined temperature in a range often considerably below the polymer's crystalline melting point. In the extreme case some polymers of low crystallinity yield resistance vs temperature curves which are more or less convex upwards. Other types of thermoplastic polymers yield resistances which increase fairly smoothly and more or less steeply but continuously with temperature. FIG. I illustrates characteristic curves for the aforementioned different types of PTC compositions. In FIG. I curve 1 exhibits the sharp virtually right angle increase in resistance (hereinafter known as type I behavior) generally characteristic of (inter alia) polymers having high crystallinity; curve 2 shows the more gradual increase at lower temperatures (relative to the polymer melting point) hereinafter known as type II behavior generally characteristic of lower crystallinity polymers. Curve 3 (Type III behavior) illustrates the convex upward curve characteristic of many very low crystallinity polymers while curve 4 (Type IV behavior) illustrates the large increase in resistance without a region of more or less constant resistance (at least in the temperature range of commercial interest) seen with some materials. Curve 5 (Type V behavior) illustrates the gently increasing resistance temperature characteristic shown by many prior art electrical resistors. Although the above types of behavior have been illustrated mostly by reference to specific types of polymeric material it will be realized by those skilled in the art that the particular type of behavior manifested is also very dependent on the type and amount of conductive filler and, particularly in the case of carbon black, on its particle size and shape, surface characteristics, tendency to agglomerate and the shape of the particle agglomerates (i.e., its tendency to structure).

It should be noted that the preferred PTC compositions taught by the prior art are all indicated to manifest essentially Type I behavior. In fact, the prior art does not specifically recognize the Types II to V behavior notwithstanding the fact that many of the PTC compositions taught by the prior art in fact exhibit not Type I, but rather Type II, III, IV, or V behavior.

With type I resistance temperature characteristics, the increase in resistance above $T_s$ is rapid so that $T_s$ may be regarded as the temperature at which the device switches off. However, with type II or type III PTC materials the transition from a resistance relatively stable as temperature is increased to a resistance rising steeply with temperature is much less well defined. Thus, the anomaly temperature or $T_s$ is frequently not an exact temperature. Thus, though we will describe a device as shutting off at a precise temperature $T_s$, it will be understood by those skilled in the art that in many practical instances it may be appropriate to understand $T_s$ as being the lowest temperature of a range in temperature over which the device switches off or, indeed, to consider $T_s$ to be a relatively narrow temperature range rather than a discrete temperature.

Prior art disclosed self-regulating thermal devices utilizing a PTC material contemplate extremely steep (Type I) $R = f(T)$ curves so that above a certain temperature the device will in effect shut off, while below that temperature a relatively constant wattage output at constant voltage is achieved. At temperatures below $T_s$ the resistance is at a relatively low and constant level and thus the current flow is relatively high for any given applied voltage ($I = E/R$). The power generated by this current flow is dissipated as Joule heat, i.e. heat generated by electrical resistance $= I^2R$, ($E^2/R$) thereby warming up the PTC material. The resistance stays at this relatively low level until about the $T_s$ temperature, at which point a rapid increase in resistance occurs. With the increase in resistance there is a concomitant decrease in power, thereby limiting the amount of heat generated so that when the $T_s$ temperature is reached heating it essentially stopped. Then, upon a lowering of the temperature of the device below the $T_s$ temperature by dissipation of heat to the surroundings, the resistance drops, thereby increasing the power output.

At a steady state, the heat generated will essentially balance the heat dissipated. Thus, when an applied voltage is directed across a PTC heating element, the Joule heat causes heating of the PTC element up to about its $T_s$, (the rapidity of such heating depending on the applied voltage and type of PTC element), after which little additional temperature rise will occur due to the increase in resistance. Because of the resistance rise, a PTC heating element will ordinarily reach a steady state at approximately $T_s$ thereby self-regulating the heat output of the element without resort to fuses or thermostats. The advantages of such a self contained heat regulating element in many applications should be apparent, in that the need for expensive and/or bulky heat control devices such as thermostats is eliminated.

Kohler, U.S. Pat. No. 3,243,753 discloses carbon filled polyethylene wherein the conductive carbon particles are in substantial contact with one another. Kohler contemplates a product containing 40% polyethylene and 60% carbon particles so as to give a resistance at room temperature of about 1 ohm/inch. As is typical of the alleged performance of the prior art materials, Kohler's PTC product is characterized by a relatively flat curve of electrical resistance versus temperature below the switching temperature, followed by a sharp rise in resistivity of at least 250% over a 25° F. range. The mechanism suggested by Kohler for the sharp rise in resistivity is that such change is a function of the difference in thermal expansion of the materials, i.e. polyethylene and particulate carbon. It is suggested that the composition's high level (i.e. 60%) of conductive filler forms a conductive network through the polyethylene polymer matrix, thereby giving an initial constant resistivity at lower temperatures. However, at about its crystalline melt point, the polyethylene matrix rapidly expands, such expansion causing a breakup of many of the conductive networks, which in turn results in a sharp increase in the resistance of the composition.

Other theories proposed to account for the PTC phenomenon in conductive particle filled polymer compositions include complex mechanisms based upon electron tunnelling through inter grain gaps between particles of conductive filler or some mechanism based upon a phase change from crystalline to amorphous regions in the polymer matrix. A background discussion of a number of proposed alternative mechanisms for the PTC phenomenon is found in "Glass Transition Temperatures as a Guide to the Selection of Polymers Suitable for PTC Materials", J. Meyer, *Polymer Engineering and Science,* November, 1973, Volume 13, No. 6. This same J. Meyer in U.S. Pat. No. 3,673,121 suggests that, based upon a phase change theory, to attain a steeply sloped PTC of resistance with a sharp cutoff (Type I) the polymer matrix should comprise a crystalline polymer having a narrow molecular weight distribution. Kawashima et al, U.S. Pat. No. 3,591,526 discloses a PTC molding composition in which the conductive particles, such as carbon black, are first dispersed in a thermoplastic material, and thereafter this dispersed mixture is blended into a molding resin. Kawashima et al likewise suggests the desirability of an extremely steep temperature-resistance curve (that is, $R=f(T)$) curve at a $T_s$ of about 100°–130° C.

Because of their flexibility, comparatively low cost, and ease of installation, PTC strip heaters comprising conductive particles dispersed in a crystalline polymer have recently found wide use as pipe tracing heaters on industrial piping and in related applications. For example, such polymeric PTC heaters, because of their self-regulating features, have been used for wrapping pipes in chemical plants to protect against freezing, or for maintaining a constant temperature which in turn permits aqueous or other solutions to flow through the pipes without "salting out".

In such applications, heaters ideally attain and are maintained at a temperature at which the energy lost through heat transfer to the surroundings equals that gained from the current. Such heaters ordinarily consist of a relatively narrow and thin ribbon or strip of carbon filled polymeric material having electrodes (such as embedded copper wires) at opposite edges along the long axis of the strip. Thus an electrical potential gradient along the plane of and transverse to the long axis of the strip has generally been contemplated, an applied voltage between the opposite electrodes resulting in heating of the entire strip, usually to approximately its $T_s$.

Obviously, from the preceeding discussion it is apparent that Type I materials have significant advantages over the other types of PTC material enumerated hereinbefore in most applications. Types II and III have a disadvantage in that because of the much less sharp transition the steady state temperature of the heater is more dependant on the thermal load placed on it. Such compositions also suffer from a current inrush problem as described in greater detail hereinafter. Type IV and V PTC materials, because they lack a temperature range in which the power output is not essentially independent of temperature have not so far been considered as suitable materials for practical heaters under ordinary circumstances.

In such uses as have been described above and in others there exists a need for flexible strip heaters with much higher power output densities and/or higher operating temperatures than are contemplated by the prior art. We have found that attempts to operate heaters, particularly strip heaters fabricated from prior art compositions and according to prior art designs at higher power outputs, i.e., higher wattage levels (above 1.5 watts/sq. in.) and/or higher temperatures, (above about 100° C.) fail. The actual wattage delivered by prior art heaters is far less than that which would be expected based on the heater area and heat transfer considerations apparently because the heat is produced in a very thin band down the long axis of the strip between the two electrodes. Such a phenomenon, which is unrecognized by the prior art, we term "hotline". This hotline phenomenon results in an inadequate and nonuniform heating performance and renders the entire heating device useless for most of the heating cycle in applications where high wattage outputs, especially at temperatures above 100° C., are desired. More specifically, because the heat output is confined to a narrow band or line transverse to a current path, the high resistance of this line prevents the flow of current across the path, in effect causing the entire heater to shut off until the temperature of the hotline drops to the $T_s$ temperature range again.

Indeed, in certain instances the heater may be permanently damaged in the hotline area.

We have discovered that this hotline condition occurs in most if not all prior art design polymeric PTC strip heaters where a voltage is applied, i.e. the current flows transversely across the strip, the extent of such condition being generally dependent upon the amount of applied voltage as well as the thermal conductivity of the polymer and the extent of non-uniform dissipation. The hot-line along the long axis of the strip, between the side electrodes, effectively shuts down the heating device even though only a small portion of the surface area of the film, i.e. the hot line, has achieved the $T_s$ temperature. This, in many cases, will destroy the heater or at the very least render it so inefficient that it appears to exhibit the very low heating capability we find to be generally associated with the PTC polymeric strip heaters of the prior art.

From the foregoing discussion, it is apparent that the elimination of hotline is critical for the efficient operation of a PTC self-regulating heater, especially one with a high power output and/or high operating temperature.

It would also be most advantageous if a PTC self-regulating heater could be fabricated wherein the heating surface was of a shape other than a relatively long, narrow strip e.g., a square or round heating pad. Also desirable would be a PTC self regulating heater which could be fabricated into relatively complex three-dimensional configurations, e.g., essentially the entire outside surface of a chemical process vessel. Unfortunately, the tendency to hot-line is particularly prevalent where the current path distance i.e. the distance between electrodes, is large relative to the crosssectional area per unit length of PTC material through which the current must flow. For example, in the case of a heating strip with electrodes at the strip edges, a relatively wide short strip has a greater tendency to hot-line than a narrow strip of the same length, composition and thickness. Likewise, for the same length and width, the thinner the strip the greater the tendency to hot-line. Increasing strip length with width and thickness held constant has no significant effect on hot-lining tendency. None of the prior art workers have even recognized the problem of hot-lining, must less suggested a heater composition and/or construction which ameliorates the problem.

Polymeric PTC compositions have also been suggested for heat shrinkable articles. For example, Day in U.S. Patent Office Defensive Publication No. T905,001 teaches the use of a PTC heat shrinkable plastic film. However, the Day shrinkable film suffers from the rather serious shortcoming that since $T_s$ is no greater than the crystalline melting point of the film, very little recovery force can be generated. Buiting et al, U.S. Pat. No. 3,413,442 suggests a heater construction involving sandwiching a polymeric layer between silver electrodes. A significant shortcoming of the Buiting et al construction is its lack of flexibility. Additionally, neither Buiting et al nor any of the other previously discussed prior art teachings even addresses, much less solves, certain additional problems inherent in all prior art PTC heaters. First, is the problem of current inrush. This problem is particularly severe when it is desired to provide a heater having a $T_s$ in excess of about 100° C. Many applications could advantageously utilize self-regulating heaters having a $T_s$ of 200° C. or even more. Unfortunately, as heretofore indicated, known prior art PTC heater constructions are essentially unsuitable for such high $T_s$ applications.

With materials having a $T_s$ substantially above 100° C., the resistance of such material at or just below the $T_s$ temperature may be as much as 10 times its resistance at ambient temperature. Since the PTC heater ordinarily functions at or slightly below its $T_s$, its effective heat output is determined by its resistance at slightly below $T_s$. Therefore, a PTC heater drawing, for example, 15 amps at 200° C. could easily draw 150 amps at ambient temperature. Such a heater system would require a current carrying capacity vastly in excess of that required for steady state operation or, alternatively, require the installation of complex and generally fragile or expensive control circuitry to prevent the 150 amp initial current inrush from burning out the heater or lead wires thereto when the heater is first connected to an electrical source.

Referring to FIG. 2, the preferred type of heater characteristic (line ABC) in its ideal form has a constant resistance (denoted by the line AB) up to $T_s$ and a resistance which increases extremely rapidly (denoted by the line BC) above the $T_s$. Thus, the operating range, say from its maximum rate to ~0 current drawn, is as shown by the dotted lines intersecting the resistance temperature curve at B and D. The power output of the ideal heater is unaffected by changes in temperature below $T_s$ but changes over its whole range in a very small range of temperatures above $T_s$. Unfortunately, as hereinbefore described, very few, if any, PTC materials actually display this ideal type of characteristic. The nearest one can usually get with practical heaters is shown by the lines AB' and B'C'. If the maximum permissible power drawn from the electrical circuit is given by the resistance at A, then the operating range for self limiting or "controlling" is given by the portion of the line B'C' lying between the dotted lines. Obviously, the heater temperature, when operating under "controlling" conditions, varies much more in this latter instance and the available power range in the "controlled" region is less than that in the ideal case. If a power range equal to that of the ideal case is desired, then a resistance characteristic such as A'B"C" is necessary.

Referring again to FIG. 2, a curve AEF represents a portion of the resistance characteristic of a PTC material of type II. If, as in the previous instance, the operating power range is set by the dotted resistance lines, it can be readily appreciated that the temperature of the heater will vary over quite wide limits in operation depending on the thermal load.

Although, as hereinabove mentioned, the prior art recognizes the considerable advantage of having a heater composition which possesses a resistance temperature characteristic of Type I, many of the compositions alluded to in the prior art show behavior more closely resembling Type II, or even Type III behavior. The optimum (Type I) characteristic is shown only by a limited selection of compositions and there has been a long felt need for a means of modifying compositions showing Type II or III behavior so that the behavior becomes or at least closely approaches that of Type I.

An additional problem inherent in all prior art PTC strip heaters is that when it is desired to heat an irregularly shaped substrate the heater must be wrapped around the substrate, generally resulting in certain portions of the strip fully or partially overlapping other portions. This overlap can cause irregular heating.

It is thus apparent that while a variety of PTC compositions and constructions are well-known to the prior art, all such compositions and constructions and indeed, any apparent combination thereof, possess serious shortcomings which severely limit the use of self-regulating PTC heating articles.

It is therefore one object of this invention to provide a design for a self-regulating heating article which ameliorates the problems of hot-lining, high currenct inrush and burn out but which is nevertheless suitable for high operating temperatures and/or current densities.

It is a further object of this invention to provide a self-regulating heating article construction which is readily fabricated into a variety of shapes including strip form or complex configurations and which exhibits good heat output even at comparatively low input voltages.

It is a further object of this invention to provide heaters manifesting behavior approximating the desirable Type I resistance-temperature characteristic from Type II, III or IV PTC materials.

It is a further object of this invention to provide heaters approximating a Type I temperature-resistance characteristic in which the power output of the heater below the $T_s$ of the PTC material is substantially unaffected by changes in temperature.

It is a further object of this invention to provide heaters whose $T_s$ temperatures are substantially independent of the nature of the PTC polymeric constituent.

It is a further object of this invention to provide a self-regulating heating article which possesses sufficient flexibility to be used in conjunction with a heat activated adhesive and/or a heat recoverable tape, sheet, tube or the like member which envelopes a substrate whereby said article's heat output effects activation of the adhesive and/or recovery of the heat recoverable member to thereby seal and/or encapsulate the substrate.

These and other objects and advantages of the instant invention will be further discussed or made apparent in conjunction with the detailed description thereof and of the embodiments, examples, and illustrations thereof set forth hereinafter.

BRIEF DESCRIPTION OF THE INVENTION

These and other objects are accomplished by providing a composite article comprising a first layer of polymeric material exhibiting a positive temperature coefficient of resistance and at least one additional constant wattage layer, said first layer and said constant wattage layer or layers being at least partially co-contiguous.

The configuration and positional relationship of the PTC and constant wattage layers and the electrodes are subject to certain critical limitations. We have found that to achieve the unexpected advantages of the present invention the following requirements must be met:

1. At any temperature at least some of the current flow between electrodes of opposite polarity must be through at least a portion of at least one PTC layer and also through at least a portion of at least one constant wattage layer.

2. In the article of the present invention the electrical and thermal gradients can be parallel or non parallel to each other, provided only that there is both direct electrical and thermal coupling between the PTC and CW layers. In a preferred embodiment of the invention the thermal and electrical gradients in the PTC layer are predominently along the same axis at or above the $T_s$ of the PTC layer or the effective $T_s$ if the latter is greater.

3. As hereafter described in greater detail, certain embodiments of the instant invention manifest an anomaly temperature higher than the intrinsic $T_s$ of the PTC layer itself. The $T_s$ of the article will be termed the effective $T_s$. At or above the intrinsic $T_s$ of the PTC layer, or the effective $T_s$, if the latter is greater, the current flow in passing through the PTC layer takes predominently the directionally shortest path through the PTC layer, even though a more circuitous route through the CW (constant wattage) layer(s) is occasioned thereby.

The configuration of the article will preferably be such that said directionally shortest current path through the PTC layer does not dimensionally exceed the maximum thickness of the PTC layer by more than about 50%, preferably by more than about 20%.

The term thickness as used herein is intended to connote the dimension between any two surfaces (interior and exterior) of the PTC layer which is the dimension of least measure. In most heater designs in accordance with the present invention current flow through the PTC material at or above $T_s$ will be predominantly perpendicular to the interface between the PTC and CW layers.

Among other advantages of the present invention we have discovered that hot-lining may be minimized or eliminated, even at extremely high wattage outputs and/or operating temperatures by impressing the input current through the thickness of the PTC layer as opposed to along its length or width.

We have also unexpectedly discovered that layering the PTC material to at least one constant wattage output material, i.e. one not having substantial PTC characteristics as hereinafter defined, results in further important benefits enabling the use of such heaters in output ranges and applications not only not contemplated but indeed virtually unattainable by prior art designs.

The CW layer or layers, if sufficiently conductive may be connected directly to a power source so as to function as and be considered to be an electrode. Alternatively, the CW layer may have impregnated therein or thereover electrodes to conduct current therethrough. Such CW layer-electrode combinations differ critically from the electrode-PTC sandwiches of the prior art since with such prior art designs the electrode layers served only as conductors and not as additional resistive heating elements. In contradistinction, in the structures of the present invention, the CW layer, which is in direct contact with the PTC layer, acts both as an electrode and also as an efficient heat output source.

Most PTC materials comprise a crystalline thermoplastic matrix having a conductive, usually particulate, filler dispersed therein. For example, the previously mentioned Kohler, U.S. Pat. No. 3,243,753 discloses a polyethylene or polypropylene carbon black composition, in which the polyolefin has been polymerized in situ, such materials exhibiting the PTC anomaly temperature close to the melt temperature of the polymers, i.e., about 110° C.±10° C. Likewise, Kohler et al, U.S. Pat. No. 3,351,882 discloses carbon particles dispersed in polyethylene in which the composition may be crosslinked, or may contain thermosetting resins to add strength or rigidity to the system. However, the $T_s$ temperature still remains just below the crystalline melting point of the thermoplastic polyolefin. Hummel et al, U.S. Pat. No. 3,412,358 discloses a PTC polymeric material comprising carbon black or other conductive particles previously dispersed in an insulating material, the homogeneous mixture in turn being dispersed in a thermoplastic resin binder. The PTC characteristics are apparently achieved by the interaction of the carbon black and the insulating material and it is suggested by Hummel et al that the insulating material must have a specific electrical resistance and a coefficient of thermal expansion higher than that of the conductive particle.

U.S. Pat. No. 3,823,217 to Kampe discloses a wide range of conductive particle filled crystalline polymers which exhibit PTC characteristics. These polymers include polyolefins such as low, medium and high density polyethylenes and polypropylenes, poly(butene-1),poly(dodecamethylene pyromellitimide), ethylene-propylene copolymers and terpolymers with nonconjugated dienes, poly(vinylidene fluoride), vinylidene fluoride-tetrafluoroethylene copolymers, etc. It is also suggested that blends of polymers containing carbon black can suitably be employed, such as polyethylene with an ethylene-ethyl acrylate copolymer. Kampe achieves lower resistance levels by cycling his products above and below the melt temperature of the polymers. Changes in resistance due to the thermal history of the sample have been found to be also minimized due to thermal cycling. U.S. Pat. No. 3,793,716 to Smith-Johannsen discloses conductive polymer compositions exhibiting PTC characteristics in which a crystalline polymer having dispersed therein carbon black is dissolved in a suitable solvent and the solution impregnated into a substrate followed by evaporation of the solvent yielding articles having decreased room temperature resistivities for a given level of conductive filler. However, $T_s$ still occurs just below the crystalline melting point of the polymer. Similarly, Kawashima et al, U.S. Pat. No. 3,591,526 discloses carbon black containing polymer blends exhibiting PTC characteristics with the $T_s$ temperature occurring at about the crystalline melting point of a thermoplastic material added to a second material for the purpose of molding the mixture.

A particularly unexpected feature of the instant invention is that when compositions of the type described in the prior art as being useful for PTC or for CW heaters are used in multi-layer heaters designed in accordance with certain embodiments of the present invention they manifest resistance/temperature characteristics which would in no way be expected from a consideration of the resistance/temperature characteristics of the individual layers or indeed that expected to result when such layers are connected together in series to thereby form an electrical circuit. Fabrication of a multilayer heater in accordance with the teaching of the present invention utilizing layers having appropriately chosen specific resistivities can substantially alter the $T_s$ of the PTC layer to a temperature to or in excess of the melting or softening point of the polymeric constituent of the PTC layer.

Thus, though the prior art teaches that $T_s$ would be expected to be independent of the geometrical configuration of the heater, we have most unexpectedly discovered that certain of the geometrical arrangements contemplated herein can result in substantial increases in $T_s$ even to above the polymer melting point, thus greatly increasing the utility and versatility of both known prior art and other compositions.

In a preferred embodiment, a layered article of this invention comprises a middle layer of conductive polymeric material exhibiting a PTC of resistance, interleaved or sandwiched between two CW layers. The CW layers may have embedded therein or deposited thereover electrodes (ordinarily metal) such that upon application of a voltage across the electrodes the current will flow through the PTC layer and thereby cause heating of both the PTC layer and the CW output layers.

In another preferred embodiment, such heating element may be bonded to a heat recoverable material or be itself rendered heat recoverable by known methods, to thereby provide a heat recoverable article which can be made to recover by means of internally generated as opposed to externally applied heat. Such an article thus advantageously avoids the requirement of an outside heating source to effect recovery, requiring only attachment to an electrical power source.

BRIEF DESCRIPTION OF THE DRAWINGS

FIGS. 1 and 2 illustrate the resistance temperature characteristics of various PTC materials.

FIGS. 3 to 5 are fragmentary perspectives partially in section showing prior art structures utilizing PTC compositions.

FIGS. 6 to 12, 13b and 15 to 34 are perspectives of or serve to illustrate and explain various embodiments of this invention.

FIG. 13a is a crosssection of the embodiment shown in 13b.

FIGS. 35 and 36 illustrate the power-temperature relationship for products described in certain of the examples.

FIG. 37 is a fragmentary perspective partially in section of a layered heater according to the present invention.

DETAILED DESCRIPTION OF THE INVENTION

Figure 14:
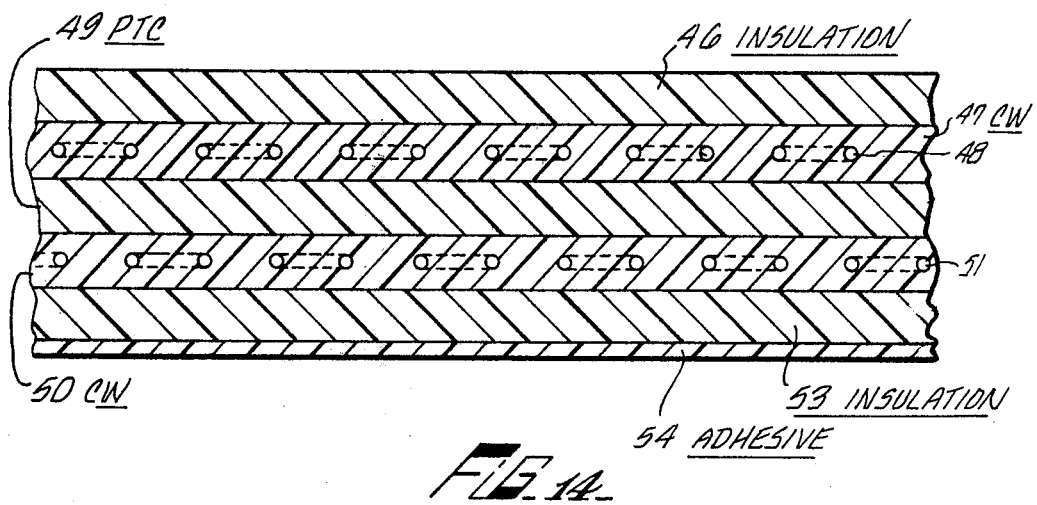
FIG. 14 is a crosssection of the embodiment shown in 15.

From the foregoing discussion it is apparent that by utilizing the teaching of the present invention thermoplastic polymer compositions having PTC characteristics can suitably be employed as a heating element, which element will approximate Type I characteristics notwithstanding that the PTC material per se would ordinarily manifest Type II, III, or IV characteristics. In particular, virtually all of the polymeric PTC materials known to the prior art as hereinabove described may suitably be used as the PTC layer in a heating element constructed according to the teaching of the present invention. Additionally, the novel PTC materials described in copending commonly assigned application of Horsma et al, now abandoned, Ser. No. 510,035, filed Sept. 27, 1974 and in copending, concurrently filed, commonly assigned application of Horsma et al entitled "Positive Temperature Coefficient of Resistance Compositions", Ser. No. 601,639, are suitable.

Suitable conductive fillers for the polymeric PTC composition useful in the present invention in addition to particulate carbon include graphite, metal powders, conductive metal salts and oxides, and boron or phosphorous doped silicon or germanium.

Preferably for best operability when used in heating apparatus of the type disclosed and claimed herein, the PTC material exhibits an increase in resistance of at least a factor of six (6) for a temperature increase of 30° C. or less starting at $T_s$.

As mentioned hereinabove, although prior art disclosures stress the practical advantages and importance of providing resistive compositions manifesting a type I resistance temperature characteristic, the number of such compositions available is relatively small notwithstanding the claims of the prior art. Most of the hitherto disclosed compositions in fact possess type II and type III resistance characteristics. Thus a method of enabling PTC material compositions having inherent type II or III resistance characteristics to manifest essentially type I behavior very greatly increases the number of compositions available for use in heating or other resistive devices. Thus, one can select a PTC material on the basis of its $T_s$ and/or other desirable physical and/or chemical properties and by using the present invention provide a heating article manifesting type I behavior.

The electrical resistivity of most electrically conductive materials, both PTC and non PTC, is found to increase or decrease more or less markedly with temperature. The magnitude of this variation ranges from the less than $\pm 0.5\%$ per degree centigrade characteristic of most metals to the $\pm 1$ to 5% or higher per degree centigrade changes exhibited by most conductive thermoplastic polymer compositions. With most materials, however, the direction and magnitude of the change is such that when operated as an electric resistance heater the temperature attained by the heater is predominantly determined by the rate of thermal conduction or radiation to its surrounding environment and not predominantly by the switching mechanism heretofore described for commercially useful PTC heater materials. Thus, the term constant wattage (or CW) material or constant wattage output material as used herein connotes a material whose resistance does not increase by more than a factor of six (6) in any 30° C. segment below the $T_s$ of the PTC material it is in contact with. Preferably, the CW material has a resistivity of at least about 1 ohm-cm at 25° C. It should, of course, also be noted that when combined with a PTC material in accordance with the teaching of the instant invention the CW layer or layers can yield a heater which, below its $T_s$, will show changes in resistivity within the above indicated limits although such layer or layers comprise materials, which if their intrinsic resistivity is measured independently, will show resistivity changes outside these limits. Additionally, since most PTC materials are, in effect, constant wattage materials up to about their $T_s$, the term constant wattage as used herein encompasses materials which manifest PTC characteristics, provided, however, that they are used in conjunction with a PTC material having a lower $T_s$. Under these circumstances, the PTC material of higher $T_s$ will not reach its $T_s$ and hence in use will manifest only essentially constant wattage characteristics.

Constant wattage materials suitable for use in the instant invention are well known to the prior art. Suitable in this respect are polymers, especially thermoplastic containing high loadings of conductive particulate materials such as carbon black or metals. Where the thermoplastic material undergoes a large change in volume at its melting or softening point so as to tend to decrease the number of conductive paths between the particles at or about that temperature and thereby cause its resistance to increase, such increases may be avoided by multiplying the number of alternative conductive paths, for example, by increasing the loading of conductive material and/or using a more structured form of the conductive material. Structured as used herein connotes both the shape of the individual particles (for example spherical, lenticular or fibrilar) and the tendency of such particles to agglomerate together when incorporated into the polymeric matrix. Also suitable are essentially inorganic, flexible constant wattage materials including carbon coated asbestos paper as taught for example in Smith-Johannsen, U.S. Pat. No. 2,952,761. Of course, in some applications it is not necessary for a high degree of flexibility to be present and resistive metal wire heaters supported by inorganic insulating materials may be utilized as the constant wattage layer.

In such case one end wire of the resistive metal heater may be electrically connected to the PTC layer via an electrode coplaner with the PTC layer surface but not necessarily coextensive with the PTC layer. In yet other applications a high degree of flexibility may only be advantageous or desired in the process of forming the article, for example, by vacuum or thermoforming. In such instances the PTC layer may be formed over or sandwiched between relatively rigid constant wattage material in the configuration of the desired article so as to maintain good thermal coupling between the layers, the current flow being either directly across the interfacing contiguous plane or by means of an intervening electrode on the surface of the PTC layer interleaved between said PTC layer and the constant wattage layer or layers. In these types of embodiments almost any type of constant wattage material contemplated by the prior art relating to electrical heaters may suitably be used.

In certain embodiments of this invention the constant wattage layer can serve as an electrode by being conductively connected directly to the electric power source. If the constant wattage heating layer is not sufficiently conductive to act as an electrode, a metal or other highly conductive material electrode such as a metal grid may be embedded therein, such electrode being conductively connected to an outside power source. In certain embodiments it may be advantageous to disperse in the constant wattage layer (which may already contain a conductive filler) an additional quantity of highly conductive (preferably metal) filler in the form of fibers or fibrils. This embodiment is particuarly advantageous when the electrodes are not coextensive with the whole planar surface of the constant wattage layer but are contiguous either with said surface or with the interface between the constant wattage and PTC layer or are embedded in said constant wattage layer.

It should be noted that the structure of the instant invention can usefully employ a wide variety of electrode configurations, types, placements, and materials. For example, metal fabric mesh or grid, flexible metal strip, convoluted wires, conductive paint, solid carbon such as carbon fibers, graphite impregnated fiber, metal coated fiber e.g. copper or stainless steel, solid metal conductor of various geometries and other electrodes as known in the art are all suitable. An electrode, whether connected to the constant wattage layer or to the PTC layer, can be fully or partially coplanar with the outer surface thereof. By outer surface of the PTC layer is meant a surface thereof not contiguous with a constant wattage layer and, conversely, for the constant wattage layer, the outer surface thereof is a surface not contiguous with the PTC layer. Alternatively, the electrode can be embedded in the PTC or in a constant wattage layer. Yet another construction involves one electrode being embedded in or on the outer surface of the PTC layer and the other electrode being located at the interface between the PTC and constant wattage layers. Of course, if desired a plurality of electrodes which are shunt connected for each polarity can be utilized with the same variety of placements being suitable.

As herein above indicated, with prior art PTC compositions and also with the novel PTC compositions of copending, commonly assigned patent application of Horsma et al, Ser. No. 510,035 filed Sept. 27, 1974, now abandoned, or copending, concurrently filed application of Horsma et al, Ser. No. 601,639 entitled "Positive Temperature Coefficient of Resistance Compositions" certain embodiments of the present invention significantly affect the operating characteristics of a heater utilizing said PTC composition. More particularly, when embedded or abutting electrodes whose surface is not coextensive with that of the constant wattage or PTC layer are used, the placement of the electrodes having an opposite polarity with respect to each other can significantly modify the operating characteristics of the apparatus. Thus, if strip electrodes of opposite polarity, coplanar but not coextensive with the outer surfaces of the constant wattage and PTC layers, are placed directly opposite and parallel with each other a different operating characteristic is obtained from that which results when the electrodes are parallel but laterally displaced with respect to one another or when the geometric projections of the electrodes on one another intersect. Although we do not wish to be bound to any particular theoretical interpretation it is believed that electrode placement has an effect on the favored current paths at different temperatures. Thus for the case of electrodes directly opposite to one another current flow is predominantly normal to the plane of the PTC layer. However, if electrodes are displaced in some manner from this arrangement and the resistance for the constant wattage layer is initially (i.e., at lower temperatures) greater than that of the PTC layer, the predominant conduction path at lower temperatures may be predominantly normal to the plane of and through the thickness of the constant wattage layer and diagonally through the thickness of the PTC layer. At some higher temperature, where the resistance of the CW and PTC layers becomes equal, conduction occurs predominantly diagonally through the thickness of both layers while at yet higher temperatures the preferred conductive path may be normal to the plane of and through the thickness of the PTC layer but diagonally through the thickness of the constant wattage layer.

In general, opposing the electrodes will yield an apparatus having a resistance-temperature curve similar but not identical to that obtained by having electrodes contiguous with the whole surface of each other layer. As the lateral and/or angular displacement of the electrodes from an opposing parallel configuration is increased the electrical characteristics tend to deviate more from that expected for a simple series connection, as described in greater particularity in the examples.

More specifically, where the electrodes are vertically spaced and the current path is vertically through the PTC and constant wattage layers, the effective $T_s$ will be that characteristic of the particular combination of layered materials. However, if one electrode is shifted in the plane of the layers such that the current path is diagonal, the effective $T_s$ is increased. Generally, the more diagonal the current path between electrodes, the higher the effective $T_s$. Indeed, where the resistance of the CW layer exceeds that of that PTC layer at the latter intrinsic $T_s$ and where such electrode placement is utilized the effective $T_s$ may be substantially above the crystalline melting point of the PTC material. Thus, as the resistivity of the constant wattage layer relative to that of the PTC layer is raised, the effective $T_s$ also tends to increase.

Of course, the electrodes may differ in shape as well as position. Thus they may be square, oblong, circular, rectilinear, planar or curved strips, spiral (with the pitch of the spiral for each electrode being the same or different) or rectilinear spiral and, as hereinbefore mentioned, the electrodes may be directly opposite or laterally or otherwise displaced with respect to one another and either or both electrodes may be monolithic or multiple in nature. It is thus apparent that the heat output and $T_s$ characteristics of the article of the instant invention can be varied by an appropriate choice of electrode shape and/or position, that selected being dependent upon the use to which the structure is to be put and a suitable arrangement being ascertainable by routine experimentation.

Although in most embodiments the PTC layer and the constant wattage layer or layers will be fully cocontiguous, in some circumstances it is advantageous for the PTC and constant wattage layers to be not fully contiguous over the entire respective opposing surfaces. Particularly where high Joule outputs at high temperature are desired, it is advantageous to generate the major portion of the heat output in the constant wattage layer. In many such instances the PTC layer will preferably be contiguous with only a portion of the opposing surface of the constant wattage layer. Such arrangement tends to reduce the effective $T_s$.

When the PTC layer is contiguous with only a part of the surface of the constant wattage layer, said PTC layer can experience wide variations in power generation. Therefore, good thermal coupling and balancing of relative power levels is desirable.

The articles contemplated by the instant invention have utility in a wide variety of applications. For example, they may be used as heaters for causing heat recoverable articles to recover on to a substrate whether by being an integral part of said heat recoverable article or by being placed in substantially abutting heat transferring relation thereto. In applications where heat activation of an adhesive is required, the high temperatures and high outputs attainable by the heaters contemplated herein render them particularly desirable. The articles are also useful where uniform heating of a substantial area is required as, for example, in heated ducts for fluid flow or as enclosure walls or panels as in ovens, residences or transportation vehicles. Other uses include heaters for industrial process pipes and vessels requiring uniform heating and/or temperature control, and deicing heaters on roads and aircraft wings. The laminar form and uniform heating characteristics of many of these articles render them particularly useful as heaters for waterbeds, warming trays and bowls and medical heating pads while their capacity for high wattage output at high temperatures in addition renders them particularly attractive as heaters for cooking appliances such as griddles and frying pans.

Turning now more specifically to the Figures, FIGS. 3 to 5 show various prior art structures utilizing PTC compositions. FIG. 3 shows a strip heater similar to that disclosed by Buiting et al, U.S. Pat. No. 3,413,442, wherein numerals 1 and 3 represent thin sheets of silver while 2 is PTC material. This is not in accordance with the present invention, even though a layered configuration is suggested, since there is no teaching of a constant wattage output material contiguous with a PTC layer.

FIG. 4 depicts a strip heater according to Kohler, U.S. Pat. No. 3,243,753 wherein numerals 5 and 7 represent grid electrodes while numeral 6 represents a PTC material.

FIG. 5 represents a common configuration of strip heaters wherein 8 and 9 are wire electrodes and 10 is a PTC material. It should be apparent that the configurations of the prior art shown in FIGS. 4 and 5 not only do not contemplate constant wattage output materials contiguous with the PTC layer, but indeed do not even suggest layered configurations.

Turning now to configurations contemplated by this invention, FIG. 6 depicts a PTC layer 11 having contiguous, or partially contiguous therewith a constant wattage heating layer 12. Overlying the surface of the constant wattage layer, is grid electrode 13 while the second grid electrode 14 is contiguous with the surface of the PTC layer opposite the surface thereof abutting constant wattage layer 12.

FIG. 7 depicts a variation of FIG. 6. The electrode, 16, is embedded in constant wattage layer 15 as opposed to overlying its outer surface. Additionally, electrodes 16 and 18 may be a continuous sheet, as opposed to a grid. Layer 17 represents the PTC material.

FIG. 8 depicts a further variation of FIGS. 6 and 7. Electrodes 20 and 22 are strip electrodes which may be shunt connected, electrodes 20 being sandwiched between the PTC layer 21 and the constant wattage layer 19. In this configuration a low resistance CW layer is desirable in that it functions to distribute the voltage potential at the interface.

FIG. 9 depicts a configuration similar to FIG. 6, with grid electrode 23 overlying the constant wattage layer 24 which in turn is contiguous with PTC layer 25. However, grid electrode 26 is sandwiched within the PTC layer.

Turning to FIG. 10, constant wattage layer 27 has embedded therein a first electrode 28, while PTC layer 29 has embedded therein a second electrode 30.

It will be understood that the various embodiments depicted in FIGS. 6 to 10 may be utilized in accordance with this invention, in any combination. More specifically, grid electrodes, as shown in FIGS. 6 and 9, film electrodes as shown in FIG. 7 or strip electrodes as shown in FIG. 8 may be utilized in any of the embodiments, and a combination of two different type electrodes may be utilized in a given configuration. A first electrode may be positioned over the constant wattage layer, embedded in the constant wattage layer or be positioned between the constant wattage layer and the PTC layer. A second electrode may be positioned on the opposite side of the PTC layers over, within or between a second constant wattage layer or beneath or embedded in the PTC layer.

FIG. 11 shows strip electrodes 32 and 34 embedded in two constant wattage layers 31 and 35, the electrode-constant wattage layers sandwiching a PTC layer 33 therebetween. Of course, as previously discussed, the electrode may take on a grid, film or other hereinbefore described configuration.

FIG. 12 represents a particular embodiment of the present invention which has been found useful for increasing the $T_s$ temperature. As previously discussed, by staggering the electrodes, so that the current path is substantially diagonally across the layers as opposed to vertically through, the effective $T_s$ temperature may be increased. Thus, in FIG. 12 strip electrodes 37 are staggered between the projections of strip electrodes 39, each set of electrodes in this embodiment being embedded in constant wattage layers 36 and 40 respectively, PTC layer 38 being sandwiched therebetween.

FIGS. 13a and 13b are a cross section, and perspective view of a particular embodiment of this invention. A plurality of wire electrodes, 42 and 45, shunt connected, are embedded within constant wattage layers 41 and 44 respectively, PTC layer 43 being sandwiched therebetween. Wires 42 may be substantially in one direction, with wires 45 being in a second direction substantially perpendicular to that of the first. Further, the overall layer configuration may take the form of a disc, such form being particularly well suited for a number of heating applications.

Figure 15:
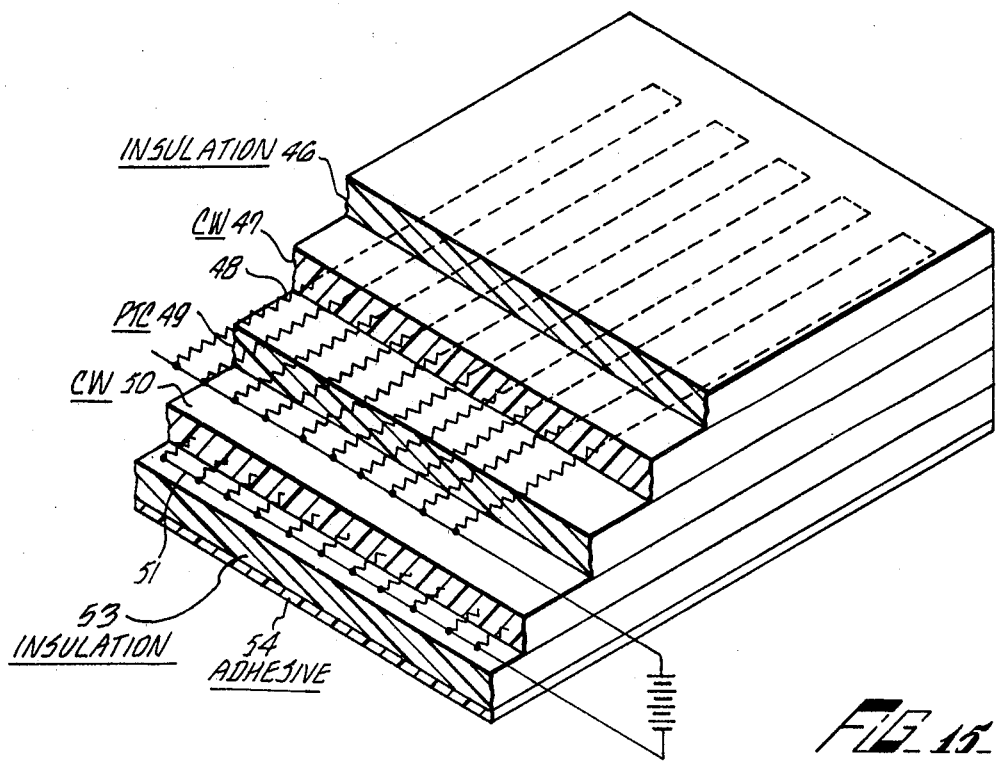

Turning to FIGS. 14 and 15, a layered configuration particularly suited for the making of heat recoverable encapsulating articles, as disclosed in applications Ser. No. 509,837 filed Sept. 27, 1974 now abandoned and Horsma et al, Ser. No. 601,344 concurrently filed herewith, entitled "Heat Recoverable Self-Heating Sealing Article and Method of Sealing a Splice Therefrom", is shown. For this application, the layers are generally of a flexible, polymeric material, with any or all of the layers being rendered heat recoverable by known means. For a more detailed description of heat recoverable articles, and their applications, see the hereinabove referred to application Ser. No. 601,344. For sealing an electrical splice, utilizing the layer composite of this invention, layer 46 may be insulating material, which may or may not be heat recoverable. Layer 47 is a constant wattage material having embedded therein electrodes 48 which may take on a braided, serrated, or convoluted configuration, and which are shunt connected to a power source. Layer 49 is a PTC material with the second set of electrodes, 51 being embedded within a second constant wattage layer 50. A second insulating material, which may be heat recoverable, 53 is placed adjacent the heating layers, and on the outer surface of layer 53 is adhesive layer 54, which is heat activated via the heating element of this invention.

In FIGS. 16 through 35 electrodes of whatever form are denoted by 55 and 56, CW layers are denoted by 57 and 58, PTC layers by 59 and 60 and a conductive substrate such as a pipe by 61.

FIG. 16 represents an embodiment in which the geometry (for example thickness) of a particular layer is locally varied to alter the watt density and/or effective $T_s$ temperature. For example, if the resistivity of the CW layer 58 is greater than that of PTC layer 60, when connection is made to a voltage source, maximum heat evolution would initially be through the maximum thickness of the PTC layer, i.e., to the right of the figure. As the heater warms up, the region of maximum heat evolution migrates to the left and at equilibrium (which would be above the intrinsic $T_s$ of the PTC layer if unassociated with the CW layer) the maximum temperature and maximum heating would occur at the region of minimum thickness of the PTC layer.

If the resistivity of the CW layer 58 and PTC layer 60 are about equal at room temperature, the heater initially heats uniformly from the right and shuts off from the right, again uniformly, as the $T_s$ or the PTC layer is reached. At equilibrium the behavior of the heater would be as above.

If the resistivity of the CW layer 58 is less at room temperature than that of the PTC layer 60, the generation of heat would always be greater in the region of minimum thickness of PTC layer 60.

FIG. 17 represents an embodiment in which the composition of the CW and PTC layers are locally varied, rather than geometry of the layers as in FIG. 16, to alter the watt density and/or effective $T_s$. In FIG. 17, the CW layers 57 and 58 differ in composition as do the compositions of PTC layers 59 and 60.

FIG. 18 is a cross-section of an embodiment in which the substrate being heated, for example, a metal pipe 61, is part of the electrical circuit, that is, it forms one of the electrodes. In FIG. 18, the layers are concentrically arranged with CW layers 57 and 58 sandwiching PTC layer 59. Because of the coaxial configuration, the current density is non-uniform in the radial direction. As is well known for coaxial constructions, the highest density is always around the inner conductor. Thus the inner layers heat first.

FIG. 19 represents an embodiment like that of FIG. 18 where the individual layers of the heater are made by consecutively wrapping the material that make up the individual layers around the object that is to be heated so as to form a layered heater in situ. The layers can be caused to adhere together by heating either externally or by passage of an electric current or the layers can be formed from materials which adhere together at the ambient temperature at which the article is applied. This is an example of an embodiment in which it may be especially useful to have the substrate form a part of the electrical circuit.

FIGS. 20 through 26 represent in cross-section another group of embodiments. In the embodiment of FIG. 20, the heater comprises cylindrical electrodes 55 and 56 embedded in CW layer 57. Around electrode 55 is a portion 59 of PTC material, circular in cross-section. This construction is particularly suited when the resistivity of the CW layer 57 is greater than that of PTC layer 59 in which case the PTC layers acts as a switch to regulate the heating of the CW layer 57. At the equilibrium temperature, heating is confined to the PTC layer.

FIG. 21 is similar to FIG. 20 and works in a similar fashion. In the case of the heaters of both FIGS. 20 and 21, the smaller the distance from the electrode in the PTC layer, electrode 55 in the case of FIG. 20 and electrode 56 in the case of FIG. 21, to the interface between CW layer 55 and PTC layer 59, the higher is the effective $T_s$ of the heater.

FIG. 22 illustrates a concentric layered heater similar to that of FIG. 18 except that the PTC layer is not overlaid by a CW layer and, as shown, the inner electrode 57 is not a substrate to be heated although it could be.

Figure 25:
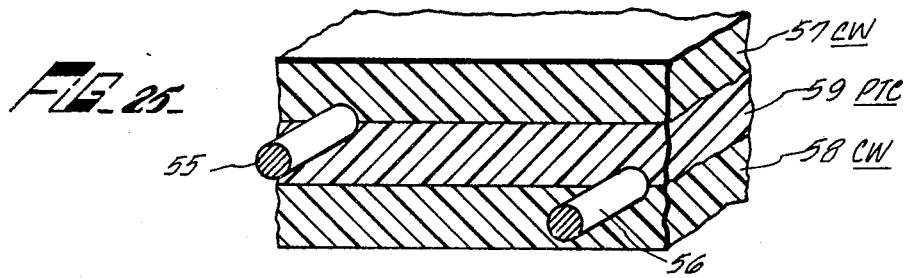

The constructions shown in FIGS. 23 through 25 are examples of heaters in which conduction below the effective $T_s$ (depending on the relative resistivity of the PTC and constant wattage layers) may be predominantly across the PTC material between the electrodes. However, when the PTC layer heats up to a temperature above its $T_s$ conduction therein occurs almost entirely from one electrode through the thickness of the PTC layer around that electrode to the constant wattage layer then along the constant wattage layer to the other electrode (again through the thickness of any PTC material which may be intervening).

FIGS. 23 and 24 depict embodiments in which the electrodes 55 and 56 are completely surrounded by the material of the PTC layer 59. FIG. 24 is a view of a section of a heater taken both laterally and longitudinally. In other words, the heater is wider than shown.

FIG. 25 is similar in structure to FIG. 24 except that the electrodes are disposed on either side of the PTC layer at the interface between the PTC layer and the adjoining CW layer. Because of this construction, the heater of FIG. 25 will heat uniformly both during warm-up and at equilibrium. In general, it can be said that if the electrodes of either polarity are in contact only with PTC material the non-uniform heating during warm-up and/or at equilibrium will result. However, if the electrodes of both polarities are wholly or but partly in contact with constant wattage material, the heater will heat uniformly during warm-up and at equilibrium provided that it has uniform geometry, i.e., the current path between nearest electrode pairs of opposite polarity is similar for all such pairs.

Figure 26:
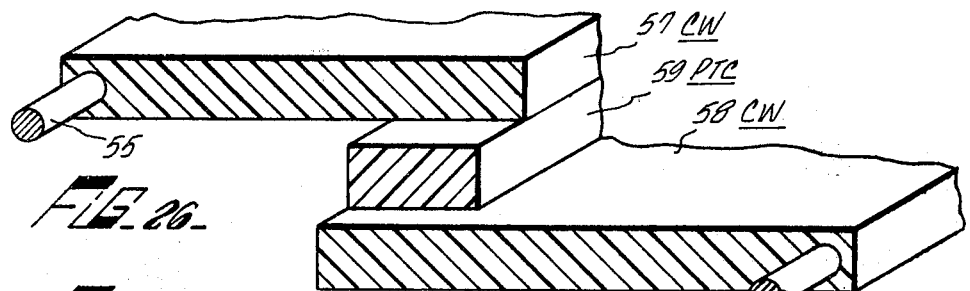
Figure 27:
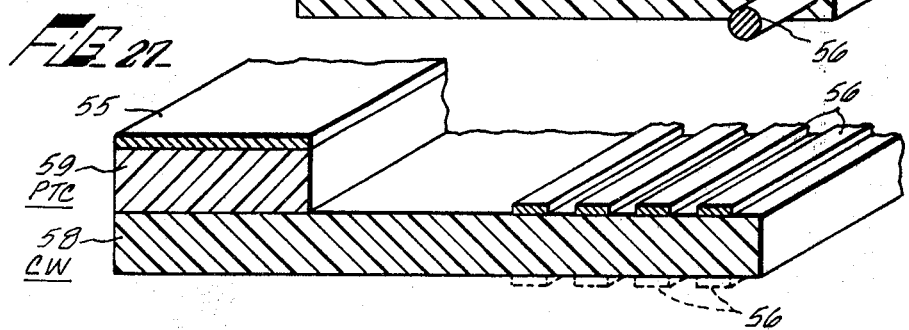

FIGS. 26 and 27 represent embodiments in which the PTC layer is contiguous with only a part of the constant wattage layer. We have found that as a fraction of the total constant wattage surface area in contact with the PTC area is reduced the ambient temperature at which for a given applied voltage a heater limits its power output is also reduced.

Figure 28:
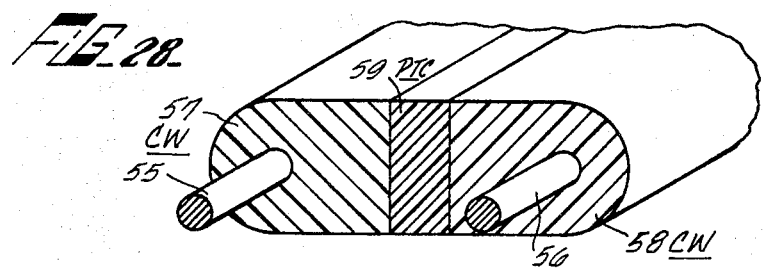

FIG. 28 shows another variant of the embodiment shown in FIG. 21. However, the heater obtained by sandwiching PTC layer 59 between CW layers 57 and 58 will heat more uniformly than that of FIG. 21. At equilibrium only the PTC layer 59 would heat.

Figure 29:
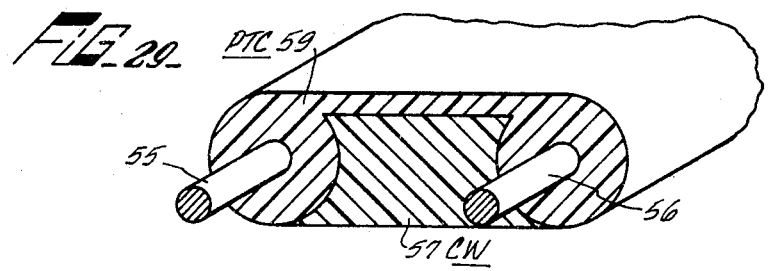

FIGS. 29 and 30 show further variants of the basic layered heater having the same general form and manner of function as FIGS. 23 through 25. As in the case of the heaters of FIGS. 23 and 24, the electrodes are embedded in the PTC layer.

FIGS. 31 and 32 illustrate other forms of the embodiment shown in FIG. 12 wherein the effective $T_s$ of the heater may be advantageously different from that of the PTC material alone as herein before described. The embodiment of FIG. 31 is similar to that shown in FIG. 28 except that the PTC layer lies at an angle less than 90° to the plane of the opposed electrodes, i.e., conductors. In general, the effective $T_s$ of the combination will increase as the angle of the PTC layer to the plane between the electrodes decreases.

The embodiment of FIG. 32 is similar to that of FIG. 16 except that the constant wattage layer 58 is sandwiched between two layers of PTC material. Its operation is also similar to that of the embodiment shown in FIG. 16.

FIGS. 33 and 34 show how useful layered heaters can be formed by combining extrusion coated wires wherein the coatings have PTC or constant wattage characteristics. In the embodiment of FIG. 33, the outermost wires are coated with PTC material whereas the innermost wire is coated with CW material. The embodiment of FIG. 34 has the reverse construction, i.e., the coating of the outermost wires is a CW material whereas the innermost wire is coated with PTC material. In these embodiments, by varying the selection of wires which are connected to an electrical supply source, the power density can be increased or, for an increase of voltage, the power density could be kept constant. These changes could be effective without changing the effective $T_s$ of the heater because the ratio of the resistance of the CW material relative to that of the PTC material between the electrodes remains the same.

In a particularly preferred embodiment of the instant invention of great utility to the manufacturer of heat recoverable devices, PTC compositions disclosed by Horsma et al in U.S. patent application Ser. No. 510,035 hereinabove referenced are used. Such compositions comprise blends of thermoplastic and elastomeric materials having conductive materials dispersed therein. As pointed out in the above specification such blends exhibit a steep rise in resistance at about the melting point of the thermoplastic component, the resistance continuing to rise with temperature thereafter. Because of the increased safety margin given by the further increases of resistance above the melting point such heaters can be designed to control at temperatures above $T_s$ and at resistances well in excess of that at $T_s$ but yet avoid the risk of thermal runaway and/or burn out which occurs when prior art PTC compositions are used in such designs. Such preferred heaters, especially when the increase in resistance with temperature above $T_s$ is very steep, are very demand insensitive, that is, the operating temperature of the PTC material varies very little with thermal load. They can also be designed to generate very high powers up to $T_s$ when electrically connected to a power source. Because of their excellent temperature control, they can be employed to activate adhesives and cause heat recoverable devices to recover around substrates such as thermoplastic telephone cable jackets without fear of melting or deforming the substrate even if left connected for considerable periods of time.

In this preferred embodiment, a heater PTC core in accordance with the teaching of Ser. No. 510,035 is combined with a constant wattage outer layer whose thermoplastic polymer ingredients, if any, have a lower melting point than that of the thermoplastic polymer component of the PTC composition. The constant wattage layer, if comprising thermoplastic polymers, can be made heat recoverable and/or optionally but preferably an additional member comprising a layer of a heat recoverable polymer composition having a recovery temperature less than the melting point of the thermoplastic component of the PTC composition is also provided. An additional layer of a hot melt adhesive or mastic may also be provided, the hot melt, if used, having a melting point similar to that of the heat recoverable member and an activation temperature less than the melting point of the thermoplastic component of the PTC composition. The electrodes are advantageously formed from flattened braided wires as disclosed in copending, commonly assigned, concurrently filed application Ser. No. 601,549 of Horsma et al entitled "Self Heating Article with Fabric Electrodes", now abandoned. Such an embodiment has been found to be particularly advantageous as hereinabove mentioned, where the substrate is heat sensitive, i.e., if warmed above its melting point will deform or flow. Such applications include telephone splice cases and many other applications in the communication industry.

The invention will be further described in the following specific examples. The articles of the instant invention may be made in a variety of ways well known to those skilled in the art. For polymer heaters the individual layers may be extruded separately and thereafter laminated, bonded or otherwise affixed together, the electrodes being inserted during extrusion or lamination as desired. The layers may otherwise be made by calendering or coextrusion, the electrodes, as previously indicated, being inserted at any suitable stage in the operation. A preferred method of fabricating a particular embodiment of a heater in accordance with the instant invention is described in the hereinabove mentioned "Heat Recoverable Self Heating Sealing Article and Method of Sealing Splice Therewith", Ser. No. 601,344 of Horsma et al.

Methods of construction of nonpolymeric conductive compositions suitable for utilization in the present invention, for example ceramics or carbon loaded asbestos paper, are well known in the art. The layers may be affixed to other layers by bonding, welding, gluing and other well known processes which preserve or maintain conductive contact between the layers.

EXAMPLE 1

A laminate was constructed as generally shown in FIG. 14 with the insulating layer comprising a blend of polyethylene and a low structure, low conductivity black. The adhesive layer was a hot melt adhesive with a ring and ball softening temperature of 110° C. The laminate was irradiated to effect cross-linking by known methods prior to coating with the adhesive, hot stretched perpendicular to the convoluted wire electrodes and cooled. The expanded sheet was wrapped around a polyethylene jacketed telephone cable and the opposing ends held together. On connecting the electrode wires to a 12 volt lead-acid battery, the laminate shrank smoothly and uniformly onto the telephone cable.

EXAMPLE 2

A $1 \times 6 \times 0.02$ inch slab to which was attached on opposite edges along its length copper electrodes and having the composition 70% of a medium density polyethylene and 18% ethylene ethyl acrylate copolymer and 12% XC72 carbon black from Cabot Corp. was annealed at 150° C. in vacuum for 16 hours and then irradiated to a dose of 20 Mrads and coated with a temperature indicating paint (Templace 76° C. indicating paint). The electrodes were connected to a 110 volt A.C. supply. Within less than a minute the white paint had melted in a thin region approximately one tenth of an inch wide and roughly equidistant between the electrodes, a "hot-line". The surface temperature in the middle of the hot line was estimated to be close to 85° C. which is just above $T_s$ for this particular composition. Regions only two tenths of an inch away from the hot line were below 50° C. In this condition the element was generating substantially all its power from the hot line area. In a similar experiment in which the element was insulated, placed in water and connected to a power source a similar "hot line" was noted. Then the composition of this example was fabricated into a laminated core sandwiched between constant wattage layers of carbon black filled silicone rubber, each constant wattage layer carrying a 20 AWG multi strand copper bus in its center. The element heated smoothly to a uniform surface temperature of about 65° C. in air, the core temperature being about 80° C. Thus, layering of the PTC layer between constant wattage layers eliminated the hot-line for this PTC composition.

EXAMPLE 3

A series of laminated heaters was constructed using a constant wattage composition consisting of ethylene-propylene rubber, 35 parts, ethylene-vinyl acetate copolymer, 30 parts and carbon black, 35 parts and a PTC core composition as described in Table I below in which the carbon black was dispersed in the polypropylene before the TPR 1900 rubber was blended in.

TABLE I

| Sample No. | 1 | 2 | 3 | 4 | 5 | 6 |
|---|---|---|---|---|---|---|
| TPR 1900 (thermoplastic ethylene-propylene rubber from Uniroyal Corporation) | 72.5 | 70.0 | 68.75 | 67.5 | 66.25 | 65.0 |

TABLE I-continued

| Sample No. | 1 | 2 | 3 | 4 | 5 | 6 |
|---|---|---|---|---|---|---|
| Profax 6524 (polypropylene from Hercules Corporation) | 16.5 | 18.0 | 18.75 | 19.5 | 20.25 | 21.0 |
| XC72 (carbon black from Cabot Corp.) | 11.0 | 12.0 | 12.5 | 13.0 | 13.5 | 14.0 |

The constant wattage and PTC materials were hydraulically pressed at 200° C. into 6×6×about 0.02 inch slabs for one minute and the heater constructions comprising a PTC layer sandwiched between two CW layers laminated at 200° C. for two minutes and then annealed at 200° C. for 10 minutes and irradiated. Heater segments 1×1.5 in. were cut from each specimen and 1×0.25 in. electrodes of conductive silver paint were painted adjacent to diagonally opposite 1 in. edges of the constant wattage layers, one electrode to each constant wattage layer, resulting in a heater construction similar to that of FIG. 12. The effect of varying composition on the inrush/operating current ratio and self regulating temperature can be seen from the inrush ratio and $T_s$ in Table II below:

TABLE II

| Composition | Carbon black level in core: | Room Temp. resistance of laminate (ohms) | Inrush Ratio* | $T_s$ (°C.)** |
|---|---|---|---|---|
| PTC Core Alone | 12.5 | — | 8 | 85 |
| 1 | 11 | 21,000 | 8 | 90 |
| 2 | 12 | 260 | 5 | 105 |
| 3 | 12.5 | 245 | 4.4 | 125 |
| 4 | 13 | 230 | 3.9 | 165 |
| 5 | 13.5 | 220 | 3.7 | 185 |
| 6 | 14 | 205 | | |

*Defined as the ratio of resistance at $T_s$ to resistance at room temperature
**Melting point of PTC approximately 165° C.

As is apparent, minor alteration of composition of the PTC material with the CW material being held constant can significantly alter the $T_s$ and the inrush ratio when used in heaters constructed according to the instant invention. Specifically, $T_s$ can be varied to above the melting point of the PTC. Furthermore, when a PTC material having a $T_s$ of 85° C., and containing 12.5% of carbon black was sandwiched between constant wattage layers, the effective $T_s$ was raised to 125° C., the resistance-temperature characteristic of the latter as shown by the inrush ratio being much closer to Type I behavior (which by definition has an inrush ratio of 1).

EXAMPLE 4

A 25 mil thick slab of PTC material having the composition described in Example 2 was laminated between two 25 mil thick constant wattage layers having the composition of the CW layers of Example 3. The laminate was annealed at 150° C. for 16 hours and then irradiated to a dose of about 10 megarads. A 1×1 in. piece cut from the laminate and painted with conductive silver paint over the entire outer surfaces of the constant wattage layers, i.e. of similar basic construction to FIG. 11, was found to have a $T_s$ of 70° C. A similar sample in which two 1×0.25 in. strip electrodes were affixed to diagonally opposite planar surfaces of the constant wattage layer (one to each layer)(i.e. similar to FIG. 12) was found to have a $T_s$ in excess of 90° C. It is thus apparent that electrode placement can significantly alter the $T_s$ of constructions in accordance with the present invention.

EXAMPLE 5

PTC compositions having the formulations and characteristics shown in Table III were prepared by mill blending, then hydraulically pressed into slabs of 10 mil thickness and irradiated to effect crosslinking. Layered heaters were constructed by sandwiching the PTC slab between two constant wattage layers of resistivity 7 ohm-cm prepared from a conductive silicone rubber (R1515) either 10 or 40 mils thick.

TABLE III

| # | Marlex 6003 % | Sterling SRFNS % | dose Mrads. | Resistance of 10 mil film ohm-cm |
|---|---|---|---|---|
| 5-1 | 58 | 42 | 12 | 1.5 |
| 5-2 | 61 | 39 | 12 | 20 |
| 5-3 | 65 | 35 | 12 | 200 |

As in the previous examples, electrodes of 1"×0.25" size were applied to the outer surface of heater segments as in Example 4. The heater was then placed on and in good thermal contact with a stainless steel block equipped with a thermometer mounted on a temperature controlled hot plate whereby the temperature of the block could be varied. The heater was connected to a voltage source of such a magnitude that it generated about two watts per square inch at about ambient room temperature. The power output (volts applied times current) of the heater was monitored as the temperature of the metal block was raised.

FIG. 35 shows how the power/temperature curve of a heater constructed from a 10 mil layer of composition 5-2 with an unirradiated 10 mil layer of constant wattage silicone varies with the electrode configuration. Unirradiated silicone constant wattage layers were chosen because their resistance changes very little with temperature and thus the observed changes can be ascribed to geometrical effects and changes in the PTC layer resistance. Three configurations were compared: (A) in which the electrode covered the whole of the upper and lower surfaces of the specimen (i.e. similar to FIG. 6 except that two CW layers were employed and the electrodes were silver paint, not mesh), (B) in which opposed silver paint electrodes (0.25×1 in.) were disposed across the upper and lower surfaces (two on each side, the electrodes on each side being spaced one inch apart), and (C) in which one upper and one lower electrode (0.25×1 in.) were alternated 1 inch apart in a staggered configuration. The power density/temperature relations for these three configurations as shown in FIG. 35 demonstrate that the power/temperature curve can be changed dramatically and unexpectedly by changes in electrode configuration. For many applications the power curve denoted C is preferred and FIG. 35 shows that with the compositions and resistances chosen this can be obtained with an alternating or laterally displaced electrode configuration. However, even when the electrodes cover the whole upper and lower surfaces of the constant wattage layer, a curve of the C type can be obtained by appropriate selection of the resistivity of the PTC and constant wattage layer as shown in FIG. 36 which indicates that to obtain a type C power curve the room temperature resistivity of the PTC layer should be less than that of the constant wattage layer. However, with alternating, laterally displaced electrodes, type C power curves are obtained by choosing a PTC layer with a resistivity higher than that of the constant wattage layers.

EXAMPLE 6

Heaters were constructed according to configuration A of Example 5 and of the same compositions as in Example 5. However, in certain specimens as shown below, the CW layer was 40 mil thick. The heaters were tested while mounted on a stainless steel block as described in Example 5. The block temperature at which the power generated by the heater commenced to drop is shown in Table IV. The results show that by varying the relative resistances of the PTC and CW layers the drop off temperature and hence $T_s$ can be varied quite significantly. Likewise, the degree of change of power with temperature is significantly affected. As is apparent, resistance for the CW layer is altered by increasing its thickness. In the last two experiments shown in Table IV the size of the PTC core layer was reduced while keeping the CW layers constant. Depending upon the ratio of interface area of the PTC layer to the CW layers, the drop of temperature can be varied quite significantly.

TABLE IV

| Heater PTC "core": | CW layer thickness | Power drop-off temperature, °F. | Power at 75° F. Power at 185° F. |
|---|---|---|---|
| 5-1 | 10 | 255 | 1.31 |
|  | 40 | 260 | 1.15 |
| 5-2 | 10 | 230 | 1.06 |
|  | 40 | 235 | 1.06 |
| 5-3 | 10 | 170 | 1.27 |
|  | 40 | 175 | 1.30 |
| 5-2* | 10 | 200 | — |
| ** | 10 | 175 | — |

*PTC layer covers ⅓ of CW layer
**PTC layer covers 1/6 of CW layer

A particular advantage of the thicker, i.e. higher resistance CW layers is that resistance variations in the PTC layer do not have such a great impact on the power output, i.e. there is less temperature variation in power output. In this way, one can use a highly crystalline, high molecular weight polymer with a highly structured carbon black for the PTC layer (such combinations yield the desired behavior, approximately Type I, but show extreme sensitivity of the resistance obtained to processing and thermal history). By combining such compositions with CW layers of much higher resistivity as may be prepared from blends of low crystallinity or amorphous polymers with medium or high structure blacks (which give resistivities of lower sensitivity to processing or thermal history), one can provide a heater of much greater uniformity, reproducibility and functional usefulness than has higherto been available.

As mentioned hereinabove, an important parameter of a functional heater is the ratio of resistance at room temperature to that at the desired operating temperature. This ratio is related to but not identical with the inrush ratio. Furthermore, lower values of this resistance ratio also indicate a closer approach to a Type I resistance characteristic. For the heaters described in this example, an operating range in the neighborhood of 185° F. is considered optimum. To obtain low ratios, PTC to CW volume resistivity ratios (at 75°0 F.) between about 0.1 and 20 (the exact ratio depending on the relative thicknesses of the layers) are preferred, those between 1 and 10 being particularly preferred.

EXAMPLE 7

PTC materials were made up as in the previous examples having the compositions given in Table V. 20 mil slabs of these compositions were laminated between two 20 mil slabs of a mixture of 20% Black Pearls carbon black in Silastic 437 (resistivity 400 ohm-cm) and the laminates then irradiated with 12 Mrads of ionizing radiation to effect cross-linking throughout.

TABLE V

| # | Marlex 6003 (%) | SRF-NS (%) | PTC layer Resistivity ohm-cm | Power curve Type (FIG. 35) |
|---|---|---|---|---|
| 7-1 | 58 | 42 | 100 | B |
| 7-2 | 60 | 40 | 240 | C but some drop off near room temp. |
| 7-3 | 62 | 38 | 400 | Very good C type |

This example demonstrates how the shape of the power curve can be modified by the selection of appropriate resistivity ratios for the PTC and CW layers. The power temperature relation is, of course, equatable with the temperature resistance relationship according to the formula $P=I^2R$ or $P=E^2/R$. The curve labeled C is close to the ideal expected to a heater having a resistance temperature characteristic of Type I.

EXAMPLE 8

Two 12 inch long sections of flat strip heater constructed in accordance with U.S. Pat. No. 3,861,029 and having a PTC core of composition similar to that used in Example 1, and shaped like FIG. 5 (⅛" wide) were affixed to an aluminum block maintained at 18° C. by circulating water. The other side of the heater sections were painted with temperature indicating paint. The voltage applied to the sections was varied so as to slowly increase their power output. One section had a resistance of 160 ohms per foot. This section could be operated at up to about 1.8 watts per foot without formation of a hot line, but with the core operating at temperature less than its $T_s$. At a power output of about two watts per foot at which power level the core warmed to its $T_s$ a hot line was formed. The other heater section, which had a resistance of about 2,650 ohms per foot could likewise be operated at about 1.8 watts per foot without hot lining, but hot lined when operated above about two watts per foot. Attempts to operate both these heaters at higher voltage levels resulted in concommitant drops in current so that under the experimental conditions these heaters did not consume more than about three watts per foot and their maximum output under these conditions was about one watt per square inch. Thus, attempts to operate the strip heater at power levels greater than about ½ watt per square inch resulted in hot-lining.

EXAMPLE 9

A layered heater, fabricated according to the instant invention, was constructed in which the PTC layer (30 mils thick) had the composition 47% Marlex 6003 5% Epsyn 5508 (ethylene-propylenediene modified rubber) and 48% Sterling SRF-NS (carbon black). Two constant wattage layers 60 mils thick having the composition 60% Elvax 250 (ethylene-vinyl acetate copolymer) and 40% cabot XC72 (carbon black) and having embedded therein flattened wire braid electrodes 0.375 inch wide and 0.375 inch apart (three in all to each constant wattage layer) were applied to either side of the PTC layer so that the electrodes were opposed to one another i.e., similarly to FIG. 11 except that the electrodes were braided rather than strips. The dimensions of the heater were three inches by six inches with the electrodes running along the long dimension with electrodes of opposite polarity extending beyond the polymeric layers at opposite ends of the heater. The layers were carefully laminated together and the article then heated at 200° C. for 10 minutes to anneal out any stress, then cooled and irradiated to 12 Mrads dose using Cobalt-60 gamma rays whilst enclosed in a container containing nitrogen. The heater was sandwiched between 10 mil thick insulating layers comprising crosslinked low density polyethylene and pressed firmly to a cooled aluminum block as in the previous example and temperature indicating paint applied to the upper surface of the heater. Electrodes of opposite polarity were connected to a 12 volt battery. The heater consumed more than 70 amps while warming up, i.e., more than 35 watts per square inch. For a period of several minutes the heater stabilized at a current of over 20 amps, i.e., greater than ten watts per square inch. Finally, the aluminum block started to warm up despite the applied cooling and the heater PTC layer warmed up to its $T_s$ (about 120° C.). The temperature indicating paint melted during this last stage starting in the center and proceeding rapidly and smoothly to the edges. In this final condition the heater maintained itself at a temperature very close to its $T_s$ and was consuming about 10 amps, i.e., a heat output of about five watts per square inch when the aluminum block was replaced by a slab of thermally insulating material. The current fell to much less than one amp, i.e., less than 0.5 watts per square inch at a heater temperature still very close to $T_s$, the whole surface of the heater being at about this temperature. It is thus apparent that a heater in accordance with the present invention can operate at high power outputs at $T_s$ temperatures well in excess of 100° C. without hot lining.

EXAMPLE 10

An additional desirable embodiment of the instant invention is illustrated in FIG. 37 wherein 55 and 56 represents conductors of different polarity, 62 represents a concentric layer of insulation around said conductors. 59 represents the PTC material and 57 and 58 the constant wattage material. The layer 62 is discontinuous over the surface of the conductor in that as shown in an article of substantially linear elongate configuration, segments of the insulation are removed intermittently along the length of the conductors. As can be see, where the insulation has been removed the conductor is in direct conductive contact with the constant wattage material. Such areas of contact for each electrode are not opposite each other but in fact diagonally opposed along the long axis of the article. The advantage of the present embodiment is that of necessity current flow between the electrodes of opposite polarity is not merely across the width of the article, i.e., distance X but in fact current must flow distance Y so that the current path is down a portion of the length of the article. A long current path is desirable in that it enables one to utilize a constant wattage material of low resistivity (enabling higher voltages to be used) without manifesting a tendency to burn out. Of course, alternative geometries for ensuring that the current flow is down at least part of the length of the article are entirely feasible.

For example, in a construction involving a PTC layer sandwiched between two CW layers and having strip electrodes disposed on the outer surface of the CW layers, this result can be achieved by intermittently disposing an insulating layer between each constant wattage layer and the electrodes disposed on its surface. This result can also be achieved by disposing a continuous insulating layer on the outer surface of the constant wattage layers and configuring the electrodes to periodically pass through the insulating layer to contact the constant wattage layer.

What is claimed:

1. A self-regulating electrical heating article adapted for connection to a source of electrical power comprising a first layer of material, said first layer exhibiting a positive temperature coefficient of resistance with an associated anomaly temperature $T_s$ and having at least partially contiguous therewith a second layer of constant wattage material having an associated resistance, said article being connectable to an electric power input source whereby current flow is through at least a portion of said first layer and through at least a portion of said second layer, whereby there is both direct electrical and thermal coupling between said first and second layers, and whereby at a temperature which is the higher of the temperature at which the resistance of said first layer exceeds the resistance of said second layer or the anomaly temperature of said first layer, current flow predominantly follows the directionally shortest path through said first layer.

2. An article in accordance with claim 1 wherein at least one of said first and second layers comprises a polymeric layer which is heat-recoverable within the operating range of the heating article.

3. The article of claim 1 having at least one exterior surface layer which is an adhesive that is activatable within the operating temperature range of said article.

4. The article of claim 1 wherein the constant wattage layer is an adhesive that is activatable within the operating temperature range of the article.

5. The article of claim 1 wherein at least one of said first and second layers comprises a polymeric composition.

6. The article of claim 5 wherein said constant wattage layer comprises a polymer having dispersed therein particulate carbon black.

7. The article of claim 5 wherein said constant wattage layer comprises a polymer having dispersed therein a highly conductive member selected from the group consisting of fibers and fibrils.

8. The article of claim 5 wherein both said first and second layers comprise polymeric compositions.

9. The article of claim 8 wherein both said layers contain particulate carbon black.

10. The article of claim 8 wherein said second layer is positioned adjacent a first surface of said first layer and a third layer of constant wattage polymeric material is positioned adjacent the other surface of said first layer and wherein at least one of said second and third layers is in conductive contact with metal electrodes.

11. The article of claim 10 having additionally a layer of heat activated adhesive, said adhesive being activatable within the operating temperature range of the article.

12. The article of claim 10 wherein said electrodes are embedded in the constant wattage layers.

13. The article of claim 10 wherein at least one of the layers is heat recoverable within the operating temperature range of the article.

14. The article of claim 1 wherein said directionally shortest path does not dimensionally exceed the thickness of said first layer by more than about 50%.

15. The article of claim 1 wherein the constant wattage layer is sufficiently conductive to act as an electrode.

16. The article of claim 1 wherein said positive temperature coefficient of resistance layer has two substantially planar surfaces and has a constant wattage layer at least partially contiguous with each of said planar surfaces.

17. The article of claim 16 wherein both said constant wattage layers are sufficiently conductive to act as electrodes.

18. The article of claim 1 wherein at least the constant wattage layer is in contact with at least one metal electrode.

19. The article of claim 18 wherein said electrode is at least partly contiguous with the surface of the constant wattage layer opposite that surface of the constant wattage layer which is adjacent the positive temperature coefficient of resistance layer.

20. The article of claim 18 wherein said metal electrode is at the interface between a positive temperature coefficient of resistance layer and a constant wattage layer.

21. The article of claim 18 wherein said metal electrode is embedded in a constant wattage layer.

22. The article of claim 18 wherein said metal electrode is of a form selected from the group consisting of fabric, braid, grid, wire, strip and sheet.

23. The article of claim 18 wherein said metal electrode is a wire conductor having a concentric layer of electrical insulation, segments of which have been removed intermittently along the length of the conductor.

24. The article of claim 1 wherein at least said positive temperature coefficient of resistance layer is in contact with at least one metal electrode.

25. The article of claim 24 wherein said positive temperature coefficient of resistance layer has at least one metal electrode embedded therein.

26. The article of claim 24 wherein said metal electrode is of a form selected from the group consisting of fabric, grid, wire, strip and sheet.

27. The article of claim 24 wherein said metal electrode is a wire conductor having a concentric layer of electrical insulation, segments of which have been removed intermittently along the length of the conductor.

28. The article of claim 1 having at least one electrode comprising a highly conductive fiber.

29. The article of claim 1 having at least one electrode comprising a conductor which is partially insulated from at least one of said layers.

30. The article of claim 1 wherein one of said first and said second layers is encompassed in cross section by the other of said layers.

31. The article of claim 30 wherein said first layer encompasses said second layer.

32. The article of claim 30 wherein said layers are concentrically disposed about an electrode.

33. The article of claim 1 wherein said article includes a plurality of electrodes at least one of which is embedded in said positive coefficient of resistance layer.

34. The article of claim 1 wherein said first and second layers are each disposed around electrodes.

35. The article of claim 1 wherein both said first and second layers are polymeric compositions and wherein a plurality of substantially elongate electrodes are in conductive contact with said layers and wherein the axes of the electrodes in contact with said first layer are non-parallel in at least one plane with the axes of the electrodes in contact with said second layer.

36. The article of claim 35 wherein the interfacing surfaces of said first and second layers are nonparallel with the non-interfacing surface of at least one of said layers.

37. The article of claim 1 wherein said article is conformed about an electrically conductive substrate whereby said current flow is at least partially through said substrate.

38. The article of claim 1 wherein said positive temperature coefficient of resistance layer has a plurality of electrodes of opposite polarity embedded therein.

39. The article of claim 1 wherein said constant wattage layer has a plurality of electrodes of opposite polarity embedded therein.

40. The article of claim 1 wherein said first layer comprises barium titanate.

41. The article of claim 1 wherein said article has an effective $T_s$ in excess of 90° C. and said $T_s$ is in excess of the inherent $T_s$ of said first layer.

42. The article of claim 41 wherein said first layer comprises an organic polymer and wherein the effective $T_s$ exceeds the melting point of said polymer.

43. The article of claim 1 wherein said second layer is a positive temperature coefficient of resistance material having an anomaly temperature $T_s$ above the $T_s$ of said first layer.

44. The article of claim 1 wherein the resistivity ratio of said first layer to said second layer ranges from about 0.1 to about 20.

45. The article of claim 1 wherein said second layer is not fully contiguous with said first layer.

46. The article of claim 45 wherein the surface area of said first layer is greater than the surface area of said second layer.

47. The article of claim 45 wherein the surface area of said second layer is greater than the surface area of said first layer.

48. The article of claim 1 wherein the Joule heat output of said article is substantially unaffected by a change in the temperature of said article up to about the effective $T_s$ of said article.

49. The article of claim 1 wherein said first layer exhibits an increase in resistance of at least a factor of six (6) for a temperature increase of 30° C. or less starting at $T_s$.

50. The article of claim 1 wherein the material of said second layer has resistivity of at least about 1 ohm-cm at 25° C.

51. The article of claim 1 in the form of an elongate flexible strip.

* * * * *